(12) United States Patent
Kuo

(10) Patent No.: US 11,432,907 B2
(45) Date of Patent: Sep. 6, 2022

(54) METHOD AND A SYSTEM USABLE IN CREATING A SUBSEQUENT DENTAL APPLIANCE

(71) Applicant: Align Technology, Inc., San Jose, CA (US)

(72) Inventor: Eric Kuo, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 644 days.

(21) Appl. No.: 16/200,445

(22) Filed: Nov. 26, 2018

(65) Prior Publication Data
US 2019/0090982 A1 Mar. 28, 2019

Related U.S. Application Data

(63) Continuation of application No. 13/605,949, filed on Sep. 6, 2012, now abandoned.

(51) Int. Cl.
*A61C 7/00* (2006.01)
*A61C 9/00* (2006.01)
(Continued)

(52) U.S. Cl.
CPC ............ *A61C 7/002* (2013.01); *A61C 9/0046* (2013.01); *A61C 7/00* (2013.01); *A61C 7/008* (2013.01);
(Continued)

(58) Field of Classification Search
CPC .. A61C 7/00; A61C 7/002; A61C 7/08; A61C 7/146; A61C 7/20; G06T 17/00; G06T 19/00
See application file for complete search history.

(56) References Cited

U.S. PATENT DOCUMENTS

| | | | |
|---|---|---|---|
| 2,467,432 | A | 4/1949 | Kesling |
| 3,407,500 | A | 10/1968 | Kesling |

(Continued)

FOREIGN PATENT DOCUMENTS

| | | | |
|---|---|---|---|
| AU | 3031677 | A | 5/1979 |
| AU | 517102 | B2 | 7/1981 |

(Continued)

OTHER PUBLICATIONS

Aadr. American Association for Dental Research, Summary of Activities, Mar. 20-23, 1980, Los Angeles, CA, p. 195.

(Continued)

*Primary Examiner* — Kibrom K Gebresilassie
(74) *Attorney, Agent, or Firm* — Wilson Sonsini Goodrich & Rosati

(57) ABSTRACT

A current digital dental model is received that includes a representation of the set of physical teeth for the patient with the current dental appliance attached to the physical teeth or oral cavity. The current digital dental model is a direct digital scan of the set of physical teeth and the current dental appliance. The physical teeth are at a position in treatment when all or a part of the current dental appliance is desired to be removed from one or more of the set of physical teeth and it is desired to use a subsequent appliance. The current digital dental model is created based a new digital dental model that includes the representation of the set of physical teeth without including the current dental appliance.

20 Claims, 15 Drawing Sheets

```
                                    1030
```

SUPERIMPOSE A SECOND REPRESENTATION OF ALL OR A PORTION OF THE CURRENT DENTAL APPLIANCE ON THE CURRENT DENTAL APPLIANCE ASSOCIATED WITH THE FIRST REPRESENTATION, WHERE THE FIRST REPRESENTATION IS THE CURRENT DIGITAL TEETH MODEL
1220

DETERMINE A SUPERIMPOSED PORTION OF THE FIRST REPRESENTATION BASED ON THE SUPERIMPOSING
1230

CREATE THE NEW DIGITAL TEETH MODEL BY REMOVING THE SUPERIMPOSED PORTION OF THE FIRST REPRESENTATION
1140

(51) Int. Cl.
　　　*A61C 7/14*　　　　(2006.01)
　　　*A61C 7/20*　　　　(2006.01)
(52) U.S. Cl.
　　　CPC ............... *A61C 7/146* (2013.01); *A61C 7/20* (2013.01); *F04C 2270/041* (2013.01)

(56) References Cited

U.S. PATENT DOCUMENTS

| | | |
|---|---|---|
| 3,600,808 A | 8/1971 | James |
| 3,660,900 A | 5/1972 | Lawrence |
| 3,683,502 A | 8/1972 | Melvin |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A | 7/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | Van Der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | Van et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |
| 6,062,861 A | 5/2000 | Andersson |
| 6,068,482 A | 5/2000 | Snow |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,309,215 B1 | 10/2001 | Phan et al. |
| 6,315,553 B1 | 11/2001 | Sachdeva et al. |
| 6,318,994 B1 * | 11/2001 | Chishti .................... A61C 7/00 433/24 |
| 6,322,359 B1 | 11/2001 | Jordan et al. |
| 6,350,120 B1 | 2/2002 | Sachdeva et al. |
| 6,381,301 B1 | 4/2002 | Massie |
| 6,382,975 B1 | 5/2002 | Poirier |
| 6,398,548 B1 | 6/2002 | Muhammad et al. |
| 6,402,707 B1 | 6/2002 | Ernst |
| 6,471,512 B1 | 10/2002 | Sachdeva et al. |

(56) References Cited

U.S. PATENT DOCUMENTS

| | | | |
|---|---|---|---|
| 6,482,298 B1 | 11/2002 | Bhatnagar | |
| 6,514,074 B1 | 2/2003 | Chishti et al. | |
| 6,524,101 B1 | 2/2003 | Phan et al. | |
| 6,540,512 B1 | 4/2003 | Sachdeva et al. | |
| 6,554,611 B2 | 4/2003 | Shishti et al. | |
| 6,572,372 B1 | 6/2003 | Phan et al. | |
| 6,629,840 B2 | 10/2003 | Chishti et al. | |
| 6,648,640 B2 | 11/2003 | Rubbert et al. | |
| 6,688,885 B1 | 2/2004 | Sachdeva et al. | |
| 6,705,863 B2 | 3/2004 | Phan et al. | |
| 6,722,880 B2 | 4/2004 | Chishti et al. | |
| 6,736,638 B1 | 5/2004 | Sachdeva et al. | |
| 7,056,115 B2 | 6/2006 | Phan et al. | |
| 7,077,647 B2* | 7/2006 | Choi | A61C 7/00 |
| | | | 433/213 |
| 7,247,021 B2 | 7/2007 | Jones et al. | |
| 7,433,810 B2 | 10/2008 | Pavlovskaia et al. | |
| 7,520,747 B2 | 4/2009 | Stonisch et al. | |
| 7,641,473 B2 | 1/2010 | Sporbert et al. | |
| 7,658,610 B2 | 2/2010 | Knopp | |
| 7,699,606 B2 | 4/2010 | Sachdeva et al. | |
| 7,840,042 B2 | 11/2010 | Kriveshko et al. | |
| 7,844,429 B2 | 11/2010 | Matov et al. | |
| 7,942,672 B2 | 5/2011 | Kuo | |
| 8,044,954 B2 | 10/2011 | Kitching et al. | |
| 8,075,306 B2 | 12/2011 | Kitching et al. | |
| 8,275,180 B2 | 9/2012 | Kuo | |
| 8,457,772 B2 | 6/2013 | Giasson et al. | |
| 8,469,705 B2 | 6/2013 | Sachdeva et al. | |
| 8,496,474 B2 | 7/2013 | Chishti et al. | |
| 8,651,859 B2 | 2/2014 | Chishti et al. | |
| 9,626,462 B2* | 4/2017 | Somasundaram | G06T 13/20 |
| 10,342,638 B2* | 7/2019 | Kitching | A61C 7/00 |
| 2002/0006597 A1 | 1/2002 | Andreiko et al. | |
| 2002/0025503 A1 | 2/2002 | Chapoulaud et al. | |
| 2003/0009252 A1 | 1/2003 | Pavlovskaia et al. | |
| 2003/0139834 A1 | 7/2003 | Nikolskiy et al. | |
| 2003/0224311 A1 | 12/2003 | Cronauer | |
| 2004/0029068 A1* | 2/2004 | Sachdeva | A61C 9/0046 |
| | | | 433/24 |
| 2004/0128010 A1 | 7/2004 | Pavlovskaia et al. | |
| 2004/0152036 A1 | 8/2004 | Abolfathi | |
| 2004/0243361 A1 | 12/2004 | Steuben et al. | |
| 2005/0055118 A1 | 3/2005 | Nikolskiy et al. | |
| 2006/0073437 A1 | 4/2006 | Kuo | |
| 2006/0084030 A1 | 4/2006 | Phan et al. | |
| 2006/0121407 A1 | 6/2006 | Dylina | |
| 2006/0263740 A1 | 11/2006 | Sporbert et al. | |
| 2006/0275731 A1* | 12/2006 | Wen | A61C 7/00 |
| | | | 433/24 |
| 2007/0031774 A1 | 2/2007 | Cinader et al. | |
| 2007/0243502 A1 | 10/2007 | Wen | |
| 2008/0182220 A1 | 7/2008 | Chishti et al. | |
| 2008/0248443 A1 | 10/2008 | Chishti et al. | |
| 2008/0305453 A1 | 12/2008 | Kitching et al. | |
| 2008/0306724 A1 | 12/2008 | Kitching et al. | |
| 2008/0318179 A1* | 12/2008 | Liu | A61C 7/00 |
| | | | 433/24 |
| 2009/0034811 A1 | 2/2009 | Kuo | |
| 2009/0208897 A1 | 8/2009 | Kuo | |
| 2009/0253100 A1 | 10/2009 | McCance et al. | |
| 2009/0291407 A1 | 11/2009 | Kuo et al. | |
| 2009/0298017 A1* | 12/2009 | Boerjes | A61C 13/0022 |
| | | | 433/214 |
| 2010/0009308 A1 | 1/2010 | Wen et al. | |
| 2010/0106465 A1 | 4/2010 | Sporbert et al. | |
| 2010/0138025 A1 | 6/2010 | Morton et al. | |
| 2010/0151404 A1 | 6/2010 | Wu et al. | |
| 2010/0159412 A1 | 6/2010 | Moss et al. | |
| 2010/0179789 A1 | 7/2010 | Sachdeva et al. | |
| 2010/0260405 A1* | 10/2010 | Cinader, Jr. | A61C 7/00 |
| | | | 382/131 |
| 2011/0004331 A1* | 1/2011 | Cinader, Jr | B33Y 80/00 |
| | | | 700/98 |
| 2011/0112804 A1 | 5/2011 | Chishti et al. | |
| 2011/0165533 A1 | 7/2011 | Li et al. | |
| 2011/0196524 A1 | 8/2011 | Giasson et al. | |
| 2012/0095732 A1 | 4/2012 | Fisker et al. | |
| 2012/0115107 A1 | 5/2012 | Adams | |
| 2014/0067334 A1 | 3/2014 | Kuo | |
| 2014/0124968 A1* | 5/2014 | Kim | A61C 7/002 |
| | | | 264/16 |
| 2015/0313687 A1* | 11/2015 | Blees | A61C 7/002 |
| | | | 433/3 |
| 2016/0324605 A1* | 11/2016 | Fisker | A61C 13/34 |
| 2019/0269482 A1* | 9/2019 | Shanjani | A61C 7/002 |

FOREIGN PATENT DOCUMENTS

| | | |
|---|---|---|
| AU | 5598894 A | 6/1994 |
| CA | 1121955 A | 4/1982 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| EP | 1754500 B1 | 11/2008 |
| EP | 2324876 A2 | 5/2011 |
| EP | 2366420 A1 | 9/2011 |
| EP | 1370315 B1 | 11/2011 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | H08508174 A | 9/1996 |
| JP | 2002526153 A | 8/2002 |
| JP | 2004504077 A | 2/2004 |
| JP | 2005523795 A | 8/2005 |
| JP | 2009544417 A | 12/2009 |
| JP | 2010514520 A | 5/2010 |
| JP | 2010155103 A | 7/2010 |
| JP | 2011500142 A | 1/2011 |
| JP | 2011507615 A | 3/2011 |
| JP | 2011510745 A | 4/2011 |
| JP | 2011087963 A | 5/2011 |
| JP | 2011514225 A | 5/2011 |
| WO | WO-9008512 A1 | 8/1990 |
| WO | WO-9104713 A1 | 4/1991 |
| WO | WO-9410935 A1 | 5/1994 |
| WO | WO-9729799 A2 | 8/1997 |
| WO | WO-9832394 A1 | 7/1998 |
| WO | WO-9844865 A1 | 10/1998 |
| WO | WO-9858596 A1 | 12/1998 |
| WO | WO-0019935 A1 | 4/2000 |
| WO | WO-2009085752 A2 | 7/2009 |
| WO | WO-2012011101 A2 | 1/2012 |
| WO | WO-2014037778 A1 | 3/2014 |

OTHER PUBLICATIONS

Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot,

(56) References Cited

OTHER PUBLICATIONS

Journal of Dental Research, vol. 58, Jan. 1979, Special Issue A, p. 221.
Altschuler et al., "Laser Electro-Optic System for Rapid Three-Dimensional (3D) Topographic Mapping of Surfaces," Optical Engineering, 20(6):953-961 (1981).
Altschuler et al., "Measuring Surfaces Space-Coded by a Laser-Projected Dot Matrix," SPIE Imaging Applications for Automated Industrial Inspection and Assembly, vol. 182, p. 187-191 (1979).
Andersson et al., "Clinical Results with Titanium Crowns Fabricated with Machine Duplication and Spark Erosion," Acta. Odontol. Scand., 47:279-286 (1989).
Andrews, The Six Keys to Optimal Occlusion Straight Wire, Chapters 3, pp. 13-24 (1989).
Bartels, et al., An Introduction to Splines for Use in Computer Graphics and Geometric Modeling, Morgan Kaufmann Publishers, pp. 422-425 (1987).
Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of III., Aug. 26-30, 1975, pp. 142-166.
Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.
Baumrind et al., "Mapping the Skull in 3-D," reprinted from J. Calif. Dent. Assoc., 48(2), 11 pages total, (1972 Fall Issue).
Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL< http://astronomy.swin.edu.au/—pbourke/prolection/coords>.
Boyd et al., "Three Dimensional Diagnosis and Orthodontic Treatment of Complex Malocclusions With the Invisalipn Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at< http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision, "Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.
Definition for gingiva. Dictionary.com p. 1-3. Retrieved from the internet Nov. 5, 2004< http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 98 at< http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).

(56) References Cited

OTHER PUBLICATIONS

Friede et al., "Accuracy of Cephalometric Prediction in Orthognathic Surgery," Abstract of Papers, J. Dent. Res., 70:754-760 (1987).
Futterling et a/., "Automated Finite Element Modeling of a Human Mandible with Dental Implants," JS WSCG '98—Conference Program, retrieved from the Internet:<http://wscg.zcu.cz/wscg98/papers98/Strasser98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
Gim-Alldent Deutschland, "Das DUX System: Die Technik," 2 pages total (2002).
Gottlieb et al., "JCO Interviews Dr. James A. McNamura, Jr., on the Frankel Appliance: Part 2: Clinical 1-1 Management,"J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates In Orthodontics and Orthognathic Surgery," JCO, pp. 262-28 (Apr. 1989).
Gwen et, al. Patient case: Orthognathic Surgery, httP://www.medicim.com/en/news-events/cases/Qatient-case-by-gwen-r-jswennen-md-dmd-Qhd, (Jun. 27, 2008), 3 pages.
Heaven et a/., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), Informatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System, Allesee Orthodontic Appliances—Pro Lab, 1 page 1998).
ISA/EP, International Search Report and Written Opinion for International Application No. PCT/IB2013/001832, dated Nov. 28, 2013, pp. 1-10.
JCO Interviews, Craig Andreiko , DDS, MS on the Elan and Orthos Systems, JCO, pp. 459-468 (Aug. 1994).
JCO Interviews, Dr. Homer W. Phillips on Computers in Orthodontic Practice, Part 2, JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports On Tooth Positioners Using LTV Vinyl Silicone Rubber, J. Nihon University School of Dentistry (1984) 26(1): 11 -29.
KAMADA et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).

Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Cfin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Office Action for Application No. JP2015530501, dated Mar. 7, 2017, 5 pages.
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sept. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
Procera Research Projects, "Procera Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993).
Raintree Essix & Ars Materials, Inc., Raintree Essix, Technical Magazine Table of contents and Essix Appliances,< http://www.essix.com/magazine/defaulthtml> Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the

(56) References Cited

OTHER PUBLICATIONS papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolamp!. Head NeckSur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee HI Orthodontic Appliances—Pro Lab product information for doctors. http://ormco.com/aoa/appliancesservices/RWB/doctorhtml>, 5 pages (May 19, 2003).
The Choice is Clear: Red, White & Blue . . . The Simple, Affordable, No. Braces Treatment, Allesee HJ Orthodontic Appliances—Pro Lab product information for patients,< http://ormco.com/aoa/appliancesservices/RWB/patients.html>, 2 pages (May 19, 2003).
The Choice Is Clear: Red, White & Blue . . . The Simple, Affordable, No. Braces Treatment, Allesee Orthodontic Appliances—Pro Lab product information, 6 pages (2003).
The Red, White & Blue Way to Improve Your Smile! Allesee Orthodontic Appliances—Pro Lab product information for patients, 2 pages 1992.

Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (July-Aug. 1972).
Van Der Zel, "Ceramic-Fused-to-Metal Restorations with a New CAD/CAM System," Quintessence Int., 24(11)769-778 (1993.
Varady et al., "Reverse Engineering Of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987.
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method

(56) References Cited

OTHER PUBLICATIONS and Its Therapeutic Effect, Part 2. Skeletal Reversed Occlusion Case Reports," Nippon Dental Review, 458:112-129 (Dec. 1980).
You May Be A Candidate For This Invisible No. Braces Treatment, Allesee Orthodontic Appliances—Pro Lab product information for patients, 2 pages (2002).

* cited by examiner

METHOD AND A SYSTEM USABLE IN CREATING A SUBSEQUENT DENTAL APPLIANCE

CROSS-REFERENCE

This application is a continuation application of U.S. application Ser. No. 13/605,949, filed Sep. 6, 2012, which is incorporated herein by reference in its entirety and to which application we claim priority under 35 USC § 120.

BACKGROUND

Frequently a patient will wear some type of dental appliance, such as a retainer, positioner, or splint, after their orthodontic braces have been removed in order to prevent the positions of the patient's teeth from deviating from the accomplished teeth arrangement. A set of braces is one example of what shall be referred to herein as a "current dental appliance." A dental appliance that is worn after removal of the current dental appliance shall be referred to herein as a "subsequent dental appliance." Retainers are an example of a subsequent dental appliance. Alternatively, patients in orthodontic braces may wish to discontinue wearing the bonded braces during treatment, and finish the remainder of their treatment with additional dental appliances such as a clear removable plastic aligner. In the event that the treatment consists of a combination of braces followed by removable aligners, a transition between the braces and aligners without having to manufacture a temporary holding retainer (to minimize tooth movement after the braces are removed) between the two phases of treatment is desired.

To manufacture the subsequent dental appliance, physical impressions may be taken with the current dental appliance still affixed to the patient's teeth in order to minimize the amount of undesirable tooth movement which may occur between the time after the removal of the current dental appliance and the time that the subsequent dental appliance is delivered. By leaving the current dental appliance on for the impressions, it is hoped that the subsequent dental appliance can be manufactured while the teeth are held in place with the current dental appliance and delivered immediately after the current dental appliances are removed. However, the impressions that are taken with the current dental appliance affixed on the patient can be difficult—not only for the clinician, but also for the patient—because of the undercuts present in the current dental appliance which lock in the impression material as it sets. This is not only uncomfortable and messy for the patient, but can also lead to impression distortion if, for example, excessive force is required to free the locked impression from the teeth when the current dental appliances are still present. As a result of any distortion in the impression, the subsequent dental appliances may not fit well on the patient's teeth when they are delivered. Even after the impression is taken, a technician will have to spend considerable effort manually cleaning up any model made from the impression and manually removing all parts of the current appliance and any distortion and other defects arising from taking the impression. These are just a few examples of why physical impressions are undesirable.

More often, the treating professional waits until the current dental appliance is removed before taking an impression. This eliminates some of the difficulties in taking the impression with the current appliance, but results in a need for a temporary retainer or no retainer for the period in which it takes to make a subsequent dental appliance. The later risks teeth movement before the subsequent dental appliance can be applied to the teeth. In either case, it also necessitates another appointment with the treating professional to fit and apply the subsequent appliance.

BRIEF DESCRIPTION OF THE DRAWINGS

The accompanying drawings, which are incorporated in and form a part of this Description of Embodiments, illustrate various embodiments of the present invention and, together with the description, serve to explain the principles discussed below.

Figure 1A:
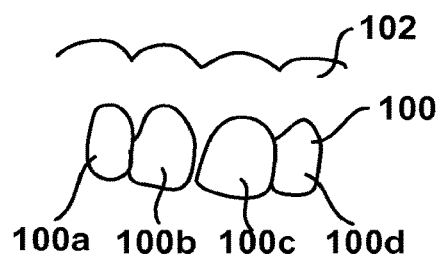
FIGS. 1a-1d, 1f, 1g illustrate a patient's set of physical teeth with respective physical teeth and gingiva and examples of dental appliances attached to the patient's set of physical teeth, according to various embodiments.

The drawings referred to in this Brief Description should not be understood as being drawn to scale unless specifically noted.

DESCRIPTION OF EMBODIMENTS

According to one embodiment, a current digital dental model, such as a digital image, is made of the patient's physical teeth with one or more current dental appliances attached to the physical teeth normally just before the current dental appliance is to be removed and replaced with a subsequent dental appliance. If the subsequent appliance is an end-of-treatment retainer, the teeth are usually at or near a desired arrangement of the teeth. If the subsequent appliance is a middle-of-treatment appliance, the teeth are at a treatment arrangement that is between the initial arrangement and the desired arrangement.

Various types of direct or indirect scanning or imaging (such as an intraoral scan, CBCT, or various types of scan of physical models or impressions including laser and computed tomography) can be used for creating the current digital dental model. According to a preferred embodiment, the current digital dental model is a direct digital scan of the set of physical teeth with the current dental appliance attached to one or more of the physical teeth. Various embodiments may also be used with a current dental appliance that is attached to the patient's oral cavity, such as to the patient's bone beneath the gingiva.

Examples of a current dental appliance include any dental appliance suitable for attachment to one or more of the patient's teeth and a dental appliance suitable for attachment to the patient's bone beneath the gingival, among others. More specifically, the current dental appliance may consist of one or more items and may be all or a portion of a set of braces (which may include bonded brackets, buttons, cemented bands, or a combination thereof), a temporary anchorage device (TAD) that is attached to the patient's oral cavity, or a dental attachment that is suitable for use with a removable plastic positioning dental appliance (also referred to herein as an "aligner"), a dental appliance suitable for attachment to bone under the gingiva of the patient, a sleep apnea appliance, a splint, a bridge, an implant, an orthodontic band, a fixed lingual retainer, a set of lingual braces or any item that has been fixedly attached to any portion of the oral cavity, as examples. Examples of types of TADs are a mini screw, a mini plate, a ball type, a bracket type and a hook type. The current dental appliance may be positioned on either the facial/buccal surface, the lingual surface of the patient's physical teeth, the gingiva, or a combination thereof.

A new digital dental model of the aligned teeth (either fully or partially) can be created based on a model of the current teeth with the current dental appliance present or from a previous model of the unaligned teeth without the current dental appliance present. For example, the new digital dental model may be created by removing the current dental appliance from the current digital dental model or by moving digital teeth of an earlier time point (of the same patient) without the dental appliance present into the same positions as the teeth in the current digital dental model (with the dental appliance present), among other things as described herein. According to one embodiment, the creation of the new digital dental model is computer automated. The creation of the new digital dental model can be fully automated or substantially-automated.

A new digital dental model can be used to manufacture a subsequent dental appliance prior to removing the current dental appliance from the patient's physical teeth. Examples of a subsequent dental appliance are a retainer, an (active) aligner, an expander, a splint or bite guard, or a positioner. The retainer may be a Hawley, an Essix-type, a bonded wire, any vacuum-formed type stent, a spring-retainer, a clear splint, or a combination thereof. At least one example of a splint is an orthognathic surgery splint, among others.

According to one embodiment, the current digital dental model and the new digital dental model includes a portion of the patient's gingiva. For example, the current digital dental model and the new digital dental model may include at least the portion of the patient's gingiva that would be covered over by or adjacent to a subsequent dental appliance.

According to one embodiment, the current digital dental model and a new digital dental model may include digital teeth that represent all of a patient's physical teeth clinically present (i.e. unerupted and/or impacted teeth not included) whether natural or prosthetic (e.g., dental crown or bridge pontic). For the sake of simplicity however, many of the figures depict a subset of the patient's physical teeth.

FIG. 1a illustrates a patient's set of physical teeth 100 with respective physical teeth 100a-100d and gingiva 102. FIGS. 1b-1d, 1f and 1g illustrate examples of dental appliances 112, 122, 132, 152, 162 attached to the patient's set of physical teeth 100, according to various embodiments. For the sake of simplicity, FIGS. 1a-g depicts a subset of the patient's physical teeth.

Example 110 depicts the patient's set of physical teeth 100 with a set of orthodontic braces 112 attached. The set of braces 112 may include one or more brackets, archwires, etc. Example 120 depicts the patient's set of physical teeth 100 with dental attachments 122 that are suitable for use with a removable plastic positioning dental appliance, such as an aligner. Example 130 depicts an orthodontic band attached to the patient's set of physical teeth 100. Example 140 depicts spaces 142, 146 on the side of the tooth and a space 144 at the back of the tooth after the removal of the orthodontic band 132 has been removed. Example 150 depicts a fixed lingual retainer 152. Example 160 depicts lingual braces.

The dental brackets and dental attachments as depicted in FIGS. 1b, 1c, 1d, 1f, 1g are considered some examples of and shall be referred to a "current dental appliance" since the dental appliances 112, 122, 132, 132, 152, 162 are currently attached to the patient's physical teeth 100. The dental attachments 122 may be aligner attachments for use with an aligner.

The patient's set of physical teeth 100 are at or close to a desired teeth arrangement, according to one embodiment. A desired teeth arrangement, according to one embodiment, is the final teeth arrangement that is accomplished as a result of orthodontic treatment. According to one embodiment, the patient's physical teeth 100 may be at the desired teeth arrangement as a result of an orthodontic treatment. According to another embodiment, the patient's physical teeth 100 are close to, but not exactly at the desired teeth arrangement. For example, due to the current dental appliance 112, a feature such as a cemented orthodontic band 132 (FIG. 1d) may take up a small space in between two physical teeth adjacent to each other. A space 142, 146 (FIG. 1e) between the adjacent physical teeth can also be referred to as an "interproximal space." When the bands are removed, the interproximal space that existed because of the bands will close. Various embodiments are also well-suited for physical teeth that are close to the desired teeth arrangement, but not exactly at the desired teeth arrangement. Another example is that a treating professional may want to start creating a subsequent appliance before the teeth have moved all the way to the desired tooth arrangement.

Although many embodiments are described in the context of a set of braces 112, the current dental appliance may be any type of dental appliance that can be attached to one or more of the patient's physical teeth 100 or to the patient's tissues within the oral cavity. The current dental appliance may be any type of dental appliance that is suitable for use with a removable plastic positioning dental appliance.

Figure 1B:
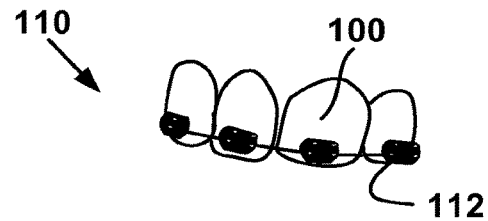
Figure 1C:
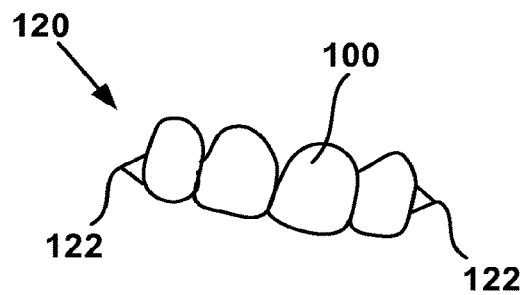
Figure 2A:
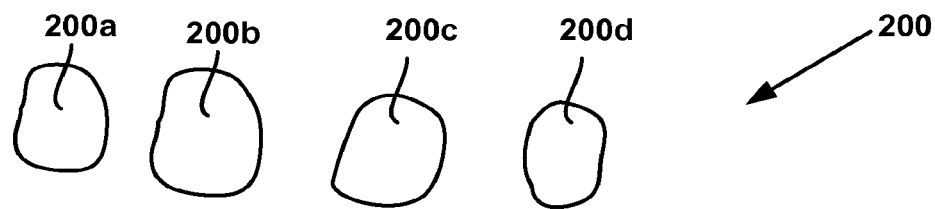
FIGS. 2a-6c illustrate techniques for creating a new digital dental model, according to various embodiments.
Figure 2B:
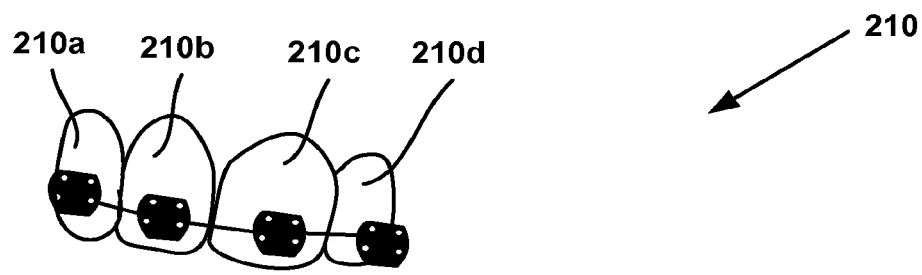
Figure 2C:
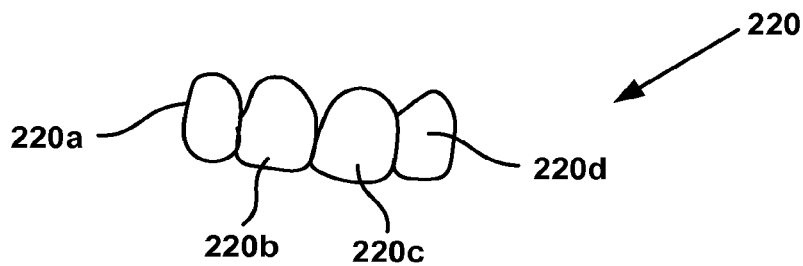

FIGS. 2a-c illustrate a technique for creating a new digital dental model, according to one embodiment. FIG. 2a depicts segmented digital teeth 200 of the patient, FIG. 2b depicts a current digital dental model 210, and FIG. 2c depicts a new digital dental model 220. The current digital dental model 210 is a representation of the patient's set of physical teeth 100 (FIG. 1a) and the dental appliance 112 (FIG. 1b) that is currently attached to the patient's physical teeth 100.

According to one embodiment, a digital scan of the patient's physical teeth 100 is taken without any dental appliance being on the patient's physical teeth 100. The digital scan can be processed to create segmented digital teeth 200 of the patient. Each 200a-200d of the segmented digital teeth 200 represents a different one 100a-100d (FIG. 1a) of the patient's physical teeth 100 (FIG. 1a). Each of the segmented digital teeth 200, according to one embodiment, has one or more axes of their own and three dimensional (3D) coordinates so that each of the segmented digital teeth can be freely positioned in 3D space. For example, 3D coordinates alone or 3D coordinates in combination with one or more axes can be used for positioning each of the segmented digital teeth 200 based on the positions of each individual digital tooth 210a-210d, 220a-220a associated with either the current digital dental model 210 or a new digital dental model 220, as will be described in more detail in the context of FIG. 16.

Each of the segmented digital teeth 200a-200d can be superimposed on the corresponding digital teeth 210a-210d associated with the current digital dental model 210. The surfaces shared in common (i.e. not covered by the dental appliance) can be used as references and the basis for the superimposition. A new location for the segmented digital teeth 200a-200d can then be assigned to each individual tooth, based on the position of the equivalent tooth in the new digital dental model 220 (the new digital dental model 220 can be segmented or unsegmented or partially segmented). The non-superimposed portion includes any portion of the current digital dental model 210 that is not part of the original digital dental model as represented by the segmented digital teeth 200. For example, the non-superimposed portion can include the current dental appliance 112 and any cement that is used for attaching the current dental appliance 112 to the patient's physical teeth 100 (FIG. 1b). The non-superimposed portion may also include changes to the gingival contours (due to inflammation for example). The new digital dental model 220 can be created either by removing the non superimposed portion of the current digital dental model 210 or by creating the new digital dental model 220 based on the superimposed portion without the non superimposed portion.

Figure 3A:
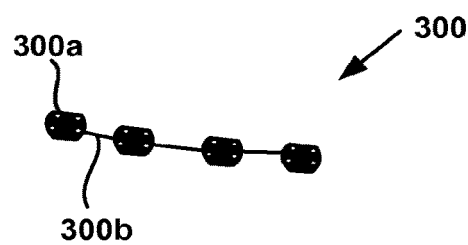
Figure 3B:
Figure 3C:
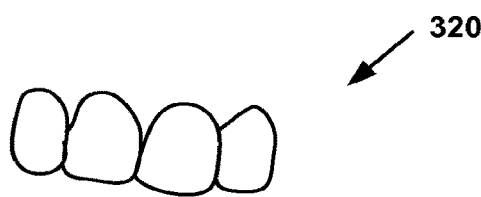

FIGS. 3a-3c illustrates a technique for creating a new digital dental model, according to one embodiment. FIG. 3a depicts a representation 300 of the current dental appliance, FIG. 3b the current digital dental model 210 (FIG. 2b), and FIG. 3c depicts a new digital dental model 320. The representation of the current dental appliance 300 may be an image that was taken of the same physical dental appliance. For example, a digital image of the dental appliance 112 (FIG. 1b) may have been taken when the dental appliance 112 was not applied to the patient's physical teeth 100 (FIG. 1a). The representation of the current dental appliance 300 or portion 300a, 300b may be an image obtained, for example, from a library of dental appliances of different types. The obtained image may be an image of a different physical dental appliance that is the same type or a similar type of as the current dental appliance 112 (FIG. 1b). For example, the obtained image may be an image of a different physical dental appliance that is the same make or model, or a combination thereof, as the current dental appliance 112 (FIG. 1b).

A representation of all 300 or a portion 300a, 300b of the current dental appliance 112 (FIG. 1b) may be superimposed. Examples of a portion 300a, 300b of the current dental appliance 112 (FIG. 1b) are a bracket, a wire, a band, a tube, a cleat, a button, a ligature wire, a hook, an aligner attachment, and an O-ring.

The representation of the current dental appliance 300 can be superimposed on the current digital dental model 210 (FIG. 2b). The portion of the current digital dental model 210 that is superimposed by the representation of the current dental appliance 300 or by the portion 300a, 300b can be determined. The new digital dental model 320 can be created, for example, by removing the superimposed portion from the current digital dental model 210 or by creating the new digital dental model 320 based on the non superimposed portion without the superimposed portion.

According to one embodiment, the new digital dental model 320 may include representations of excess cement or offsets to the surfaces of the physical teeth due to the cement, or a combination thereof. Therefore, a subsequent dental appliance that is created based on the new digital dental model 320 will fit the patient's physical teeth 100 (FIG. 1a) but may be slightly larger than a subsequent dental appliance created, for example, using a new digital dental model 220 (FIG. 2b). Various embodiments can be used to remove the representations of the excess cement. For example, at least various embodiments described in the context of FIGS. 5a-5c may be used to remove the representations of the excess cement.

Figure 4A:
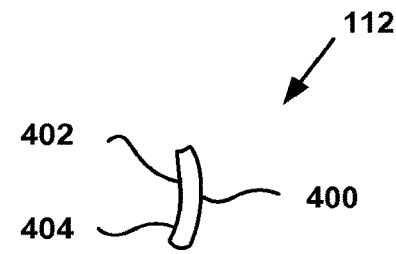
Figure 4B:
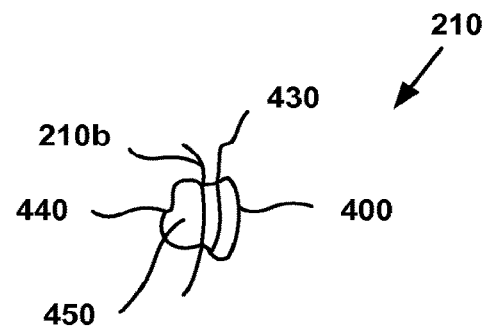
Figure 4C:
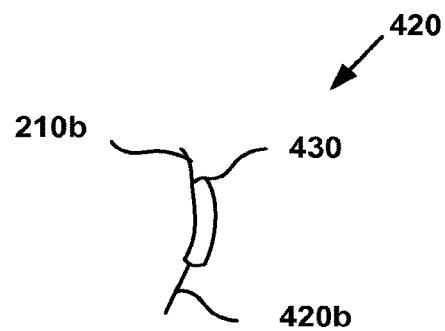

FIGS. 4a-4c illustrate a technique for creating a new digital dental model, according to one embodiment. FIG. 4a depicts a bracket base 400, a digital tooth 210b that is a part of a current digital dental model 210, and a representation 420b that is a part of a new digital dental model 420. The bracket base 400 is associated with a current dental appliance 112 (FIG. 1b) for the patient or is associated with a dental appliance that is a similar type or the same type as the current dental appliance 112 (FIG. 1b). The underneath surface 402 of the bracket base 400 has a contour 404 that approximates the contour 450 of the digital tooth 210b's portion 440.

As depicted in FIG. 4b, a bracket base 400 is attached to a portion 440 of a digital tooth 210b with cement 430. According to one embodiment, the contour 450 of the portion 440 of the digital tooth 210b associated with the current digital dental model 210 (FIG. 2b) is estimated based on the contour 404 of the underneath surface 402 of the bracket base 400.

Various embodiments are well-suited for approximating the contour 450 of a portion 440 a digital tooth portion 440 based on other portions, as discussed herein, of a dental appliance besides a bracket base, as discussed herein. For example, if a portion of a digital tooth is beneath a bonded lingual wire, various embodiments are well-suited for using a contour underneath the bonded lingual wire to estimate the contour of a portion of digital tooth that would be beneath that wire.

Referring to FIG. 4c, according to one embodiment, the new digital tooth 420b of the new digital dental model 420 may include representations of excess cement 430 or offsets to the surfaces of the physical teeth due to the cement 430, or a combination thereof. For example, cement 430 may appear to be part of the digital tooth 210b. Therefore, a subsequent dental appliance that would be created based on the new digital dental model 420 (FIG. 4c) would fit the patient's physical teeth 100 (FIG. 1a) but may be slightly larger than a subsequent dental appliance created, for example, using a new digital dental model 220 (FIG. 2b). Therefore it is desirable to remove such representations of excess cement and or offsets. Various embodiments can be used to remove the representations of the excess cement 430. For example, at least various embodiments described in the context of FIGS. 5a-5c may be used to remove the representations of the excess cement 430.

Figure 5A:
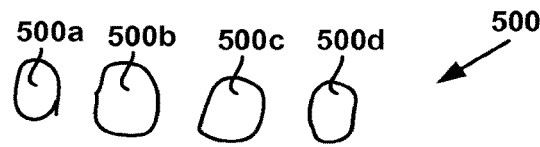
Figure 5B:
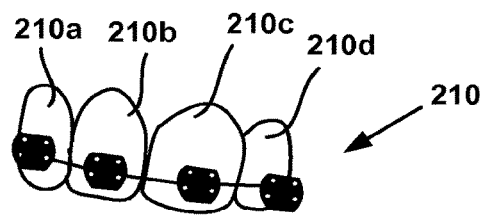
Figure 5C:

FIGS. 5a-5c illustrate a technique for creating a new digital dental model, according to one embodiment. FIG. 5a depicts digital teeth 500a-500d that are each similar to respective digital teeth 210a-210d (FIG. 2b) associated with a current digital dental model 210. A similar digital tooth 500a-500d may be obtained by averaging a plurality of digital teeth from a library of digital teeth, for example. A similar digital tooth 500a-500d may be an image of another physical tooth associated with the patient. For example, because of midplane symmetry of most individuals, a patient's two front teeth 100b, 100c (FIG. 1a) are approximate mirror images of each other. A digital image of one of a patient's front teeth 100b can be created based on a mirror image of a digital image of the patient's contralateral front tooth 100c. Physical teeth 100a and 100d (FIG. 1a) are also examples of teeth that may be similar to each other. For example, a mirror image of physical tooth 100a could be superimposed on digital tooth 210d or a mirror image of physical tooth 100d could be superimposed on digital tooth 210a. The similar digital teeth 500 may be images of physical teeth from another person besides the patient. For example, the other person may be selected based on similar demographics as the patient. Examples of demographics used in determining if digital teeth are similar to each other include sex, age, ethnicity, size of teeth, such as small, medium, or large, and shape of the teeth, such as bulbous or flat, square or tapered.

A similar digital tooth 500a-500d may be resized based on the size of a digital tooth 210a-210d (FIG. 2b) in the current digital dental model 210 (FIG. 2b). For example, the similar digital tooth 500a-500d may be resized to match or approximately match one of the digital teeth 210a-210d in the current digital dental model 210. According to one embodiment, the similar digital tooth 500a-500d is resized to be slightly larger than the digital tooth 210a-210d that it will superimpose to ensure that the subsequent dental appliance fits the patient's physical teeth 100 (FIG. 1a).

A similar digital tooth 500a-500d, according to one embodiment, has its own three dimensional (3D) coordinates, as discussed herein, so that a similar digital tooth 500a-500d can be positioned, for example, based on the position of a corresponding digital tooth 210a-210d (FIG. 2b) associated with either the current digital dental model 210 or the new digital dental model 520.

Each of the similar digital teeth 500a-500d can be superimposed on corresponding digital teeth 210a-210d (FIG. 2b) associated with the current digital dental model 210. The 3D coordinates associated with each of the similar digital teeth 500a-500d can be reset as a part of the superimposing. The non superimposed portion can then be determined. For example, the non-superimposed portion includes the current dental appliance 112 (FIG. 1b). The new digital dental model 520 can be created by removing the non-superimposed portion of the current digital dental model 210 (FIG. 2b) or by creating the new digital dental model 520 based on the superimposed portion without the non superimposed portion.

Figure 6A:
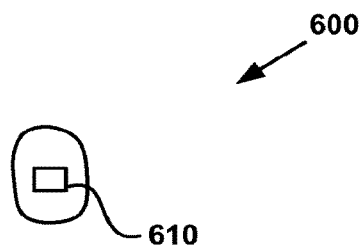
Figure 6B:
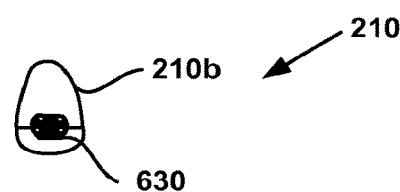
Figure 6C:
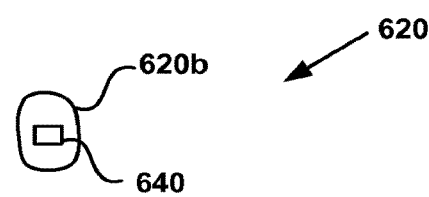

FIGS. 6a-c illustrate a technique for creating a new digital dental model, according to one embodiment. An area or a subset 630 of a digital tooth 210b (FIG. 2b) in the current digital dental model 210 (FIG. 2b) may be beneath a portion of the current dental appliance 112 (FIG. 1b). Examples of a portion of the current dental appliance are a bracket, a wire, a tube, a cleat, a button, a ligature wire, a hook, a band, an aligner attachment, and an O-ring. According to one embodiment, a corresponding area or subset 610 of a similar digital tooth 600, as described herein, can be used to estimate a contour of the hidden area or subset 630 of a digital tooth 210b in the current digital dental model 210. The estimation can be used for creating a contour in a corresponding area of the subset 640 for a digital tooth 620b of the new digital dental model 620.

According to one embodiment, the physical teeth 100 (FIG. 1a) may be close but not at the desired teeth arrangement when the current digital dental model 210 (FIGS. 2a-6c) is created. For example, the current dental appliance may have a feature, such as an orthodontic band 132 (FIG. 1d) that prevents complete closure of an interproximal space between adjacent physical teeth. In another example, the patient may be unavailable when their teeth 100 (FIG. 1a) are at the desired teeth arrangement, for example, due to travel plans. The current digital dental model 210 (FIG. 2b) may be created before the patient leaves on their trip so that a subsequent dental appliance, such as a retainer, will be available upon their return, at which time, the one or more of the current appliances would be removed.

Therefore, according to one embodiment, to create a current digital dental model 210 (FIGS. 2b-6b) when the patient's physical teeth 100 (FIG. 1a) are close but not at the desired teeth arrangement, positions of one or more digital teeth in the new digital dental model 220-620 (FIGS. 2c-6c) may be adjusted to the desired teeth arrangement. Information pertaining to one or more dimensions of the feature or descriptions of the feature can be used to determine how to adjust the positions of the one or more digital teeth in the new digital dental model 220-620 (FIGS. 2c-6c). For example, in the case of an orthodontic band 132 (FIG. 1d), the width of the orthodontic band (either as a known dimension or a measurement derived from the scan) can be used to adjust the positions of the digital teeth to reflect that the interproximal space which had been maintained physically by the band will lessen when the band is removed. A subsequent dental appliance that is manufactured based on a new digital dental model 220-620 (FIGS. 2c-6c) adjusted to the desired teeth arrangement can be used to move the physical teeth to the desired teeth arrangement. An individual digital tooth's 3D coordinates can be adjusted as a part of adjusting positions, as discussed herein, meaning, for example, that the individually segmented digital teeth may be digitally repositioned within the arch.

Figure 7:
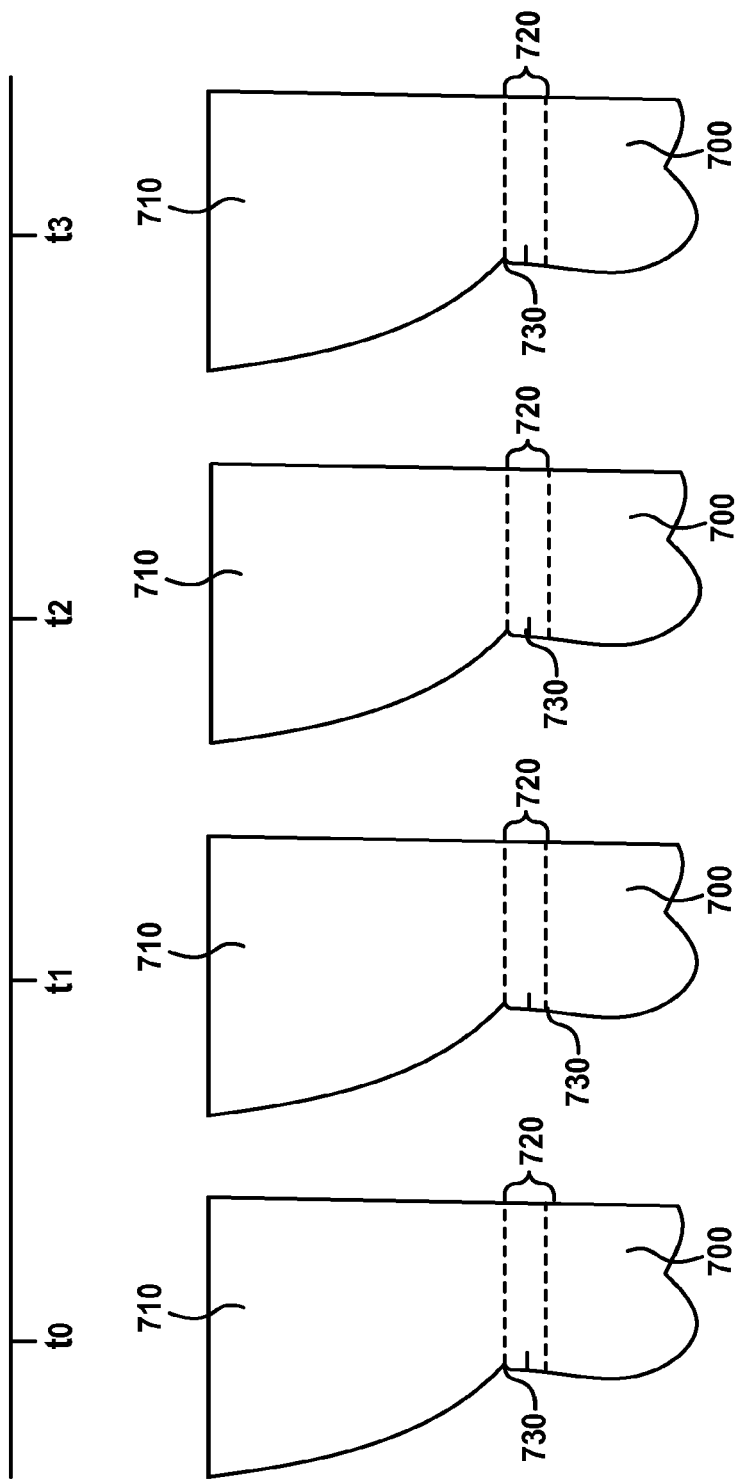
FIG. 7 illustrates changes to a patient's gingiva, according to one embodiment.

FIG. 7 illustrates changes in a patient's gingiva, according to one embodiment. FIG. 7 depicts one of the patient's teeth 700 and corresponding gingiva 710. Frequently after a current dental appliance, such as a set of braces, the patient's gingiva 710 can be swollen or inflamed. With time and appropriate hygiene, the puffiness of the patient's gingiva 710 tends to reduce, causing the gingival contours to decrease. For example, as depicted in FIG. 7, the patient's gingiva 710 is at the baseline at t0 (pre-treatment), becomes inflamed and is the most enlarged at time t1, and then less enlarged at time t2 as the inflammation reduces, and is near or back to normal at time t3.

According to one embodiment, a new digital dental model 220-620 (FIGS. 2c-6c) includes the portion of the patient's gingiva that is in proximity of the subsequent dental appliance or that would be covered by a subsequent dental appliance, or a combination thereof. According to one embodiment, a series of new digital dental models can be created, for example, that takes into account the changes in the patient's gingival contour 730. For example, a new digital dental model may be created that accommodates the patient's gingiva 710 at time t1, a second new digital dental model may be created that accommodates the patient's gingiva 710 at time t2, and a third new digital dental model may be created that accommodates the patient's gingiva 710 at time t3. Further, as depicted in FIG. 7, the gingival contour 730 increases as indicated by 720, for example, from time t0 to t1. Various embodiments are also well-suited for swollen gingiva 710 due to a portion of a current dental appliance 112 (FIG. 1*b*) being placed near the patient's gingiva.

According to one embodiment, one or more changes in the patient's gingiva is simulated, as will be described in more detail in the context of FIGS. 17-19. According to another embodiment, the patient's gingival contour prior to treatment is used to estimate one or more changes in the patient's gingiva. For example, a digital dental model taken at time t0 (FIG. 7) of the patient's teeth and gingiva that was created prior to changes in the patient's gingiva or prior to application of a dental appliance may be used. Any type of imaging or scanning as discussed herein may be used for obtaining the digital dental model. Further, the current digital dental model may include a representation of the patient's gingiva contour when the patient's physical teeth are at a treatment position or at or close to the desired teeth arrangement. The prior digital dental model and the current digital dental model can be used to estimate the changes in the patient's gingival contour over time. For example, a linear or an exponential curve, among others, could be used to estimate the patient's expected gingival changes. According to one embodiment, the patient's gingival contour is modeled so that the subsequent dental appliance adapts well and does not leave any exposed edges that might irritate the tongue or surrounding soft tissue while at the same time providing an appliance that is not too tight, which might irritate the tissue underneath from the pressure exerted by the appliance. According to one embodiment, the patient's gingiva is selectively modeled. For example assuming for the sake of illustration that a first portion of the patient's gingival at time t3 is swollen and a second portion of the patient's gingiva at time t3 has experienced recession or shrinkage. In this case, a first gingival modeling technique can be used on the first portion of the patient's gingiva and a second gingival modeling technique can be used on the second portion of the patient's gingiva. For example, the changes that will occur in the patient's gingiva after removal of the current dental appliance can be tracked using simulation or non-simulation embodiments on the first portion while the patient's pre-treatment gingival contour taken at time t0 can be used for the second portion without or with minimal use of simulation or non-simulation embodiments.

Figure 8A:
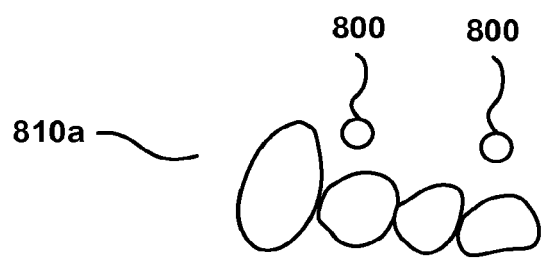
FIGS. 8a and 8b depict examples of temporary anchorage devices (TADs) 800 attached inside the patient's oral cavity, according to various embodiments.
Figure 8B:
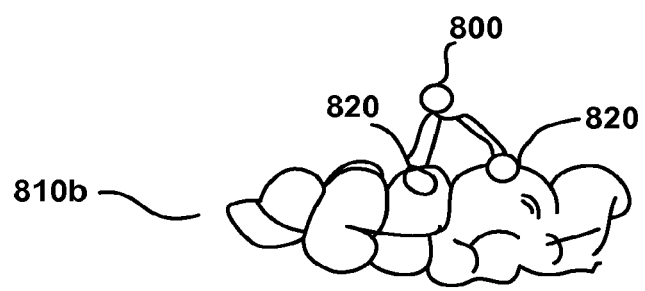

FIGS. 8*a* and 8*b* depict examples of temporary anchorage devices (TAD) 800 attached to the patient's oral cavity, according to various embodiments. FIG. 8*a* depicts TADs 800 located on the labial (or facial) side of the oral cavity 810*a* and FIG. 8*b* depicts a TAD with buttons 820 bonded to teeth located on the lingual side of the oral cavity 810*b*. A temporary anchorage device 800 is an example of a current dental appliance that could be a part of a current digital dental model 210 (FIGS. 2*b*-6*b*) and that various embodiments are well-suited for creating a new digital dental model that excludes the temporary anchorage device 800. Examples of portions of the oral cavity 810 that may be a part of a current digital dental model and a new digital dental model for the purposes of various embodiments is any portion of the oral cavity 810 that a subsequent dental appliance, such as a retainer, may overlap. The alveolar bone under the gingiva is an example of a portion of the patient's oral cavity 810. Other examples of anchorage devices are a bonescrew and a plate. A TAD 800 may have a ball, a bracket or a hook, among other things, on the end that is exposed to the oral cavity for the purpose of attaching, for example, a wire, elastic, or a ligature, among other things.

Various embodiments are also well-suited for changes in the gingiva that result from a TAD or other types of devices that cause changes to the gingiva. For example, a portion of a TAD will typically be embedded in the gingiva into the bone beneath, which can cause a portion of the gingiva to swell. Various embodiments, such as a simulation, not requiring a simulation, and using the patient's original gingiva contour (depicted at time t0 in FIG. 7), as described herein, are well-suited for calculating, estimating, determining the changes in the patient's gingiva due to a dental appliance that is attached to the oral cavity.

As discussed herein, for the sake of simplicity, many embodiments were described in the context of a current digital dental model 210 that is a representation that included a set of braces. However, as discussed herein, embodiments are well suited for removing a current dental appliance 122 (FIG. 1*b*) that is suited-for use with a removable plastic positioning dental appliance, such as an aligner. For example, various embodiments are well suited for a current digital dental model that includes a representation of the set of physical teeth 100 (FIG. 1*a*) for the patient with the current dental appliance 122 attached to the physical teeth 100. According to one embodiment, the geometry of the current dental appliance 122 in combination with the geometry of the physical teeth 100, for example as represented by segmented digital teeth 200, can be superimposed on a current digital dental model to determine portions to be kept or removed as a part of creating a new digital dental model using various embodiments discussed herein. Further, embodiments are well suited for using different embodiments for different teeth. For example, if a physical tooth, which does not have a current dental appliance 122 attached, has been altered due to esthetics or removal of heavy contacts for occlusion adjustment, among other things, a digital tooth from the current digital dental model that corresponds to that physical tooth can be superimposed back onto itself. In another example, if a physical tooth has a current dental appliance 122 attached to it, a digital image of that physical tooth taken prior to application of the current dental appliance 122 can be superimposed.

According to one embodiment, the creation of a new digital dental model 220-620 (FIGS. 2*c*-6*c*) is computer automated. For example, one or more computer processors may be used for creating the new digital dental model 220-620 (FIGS. 2*c*-6*c*). According to one embodiment, the creation is entirely automatic without human intervention or without requiring human intervention. According to another embodiment, the creation is substantially automatic with some human intervention for clean up and double checking. According to one embodiment, the system is not merely a computer graphics system that a human uses to manually remove digital portions using a digital eraser or to copy digital portions of the current digital dental model 210 (FIGS. 2*b*-6*b*) as a part of creating the new digital dental model 220-620 (FIGS. 2*c*-6*c*). The phrase "computer automated" shall be used to refer to entirely automatic or substantially automatic. One example of substantially automatic is where a user can select a point, such as any voxel or 3D triangle, of a depicted orthodontic bracket of a current digital dental model 210 (FIGS. 2*b*-6*b*) and the system can detect the remaining portions connected to the selected region which can include, for example, the bracket or the bracket and the cement. In this case, the user may only identify and select one point for up to 32 digital teeth on a current digital dental model 210 (FIGS. 2*b*-6*b*).

According to various embodiments, a current digital dental model 210 (FIGS. 2b-6b) and the new digital dental models 220-620 (FIGS. 2c-6c) are three dimensional models. According to various embodiments, a new digital dental model 220-620 (FIGS. 2c-6c) can be used to manufacture a subsequent dental appliance prior to removing the current dental appliance 112, 122, 132, 152, 162, 800, 820 (FIGS. 1b, 1c, 1d, 1f, 1g, 8a, 8b) from the patient's physical teeth 100 (FIG. 1a). For example, the new digital dental model 220-620 (FIGS. 2c-6c) may be used to manufacture a subsequent dental appliance, such as a retainer, a splint or a positioner, among others, as discussed herein. A new digital dental model 220-620 (FIGS. 2c-6c) can be segmented or unsegmented or partially segmented, among other things.

According to one embodiment, a new digital dental model 220-620 (FIGS. 2c-6c) does not include or does not require the inclusion of any digital roots corresponding to any of the patient's physical teeth 100a-100d (FIG. 1a). According to one embodiment, a new digital dental model 220-620 (FIGS. 2c-6c) does not include or does not require the inclusion of any digital crowns. According to one embodiment, the current teeth arrangement of the digital teeth 210a-210d (FIG. 2b) of the current digital dental model 210 (FIGS. 2b-6b) is a current planned teeth arrangement that did not occur out of error or out of deviations but occurred due to the planned treatment. Therefore, according to various embodiments, neither a current digital dental model 210 (FIGS. 2b-6b) nor a new digital dental model 220-620 (FIGS. 2c-6c) is used or is required to be used as a part of causing the patient's physical teeth 100a-100d (FIG. 1a) to be positioned at a teeth arrangement that preceded the current planned teeth arrangement associated with the current digital dental model 210 (FIGS. 2b-6b).

Figure 9:
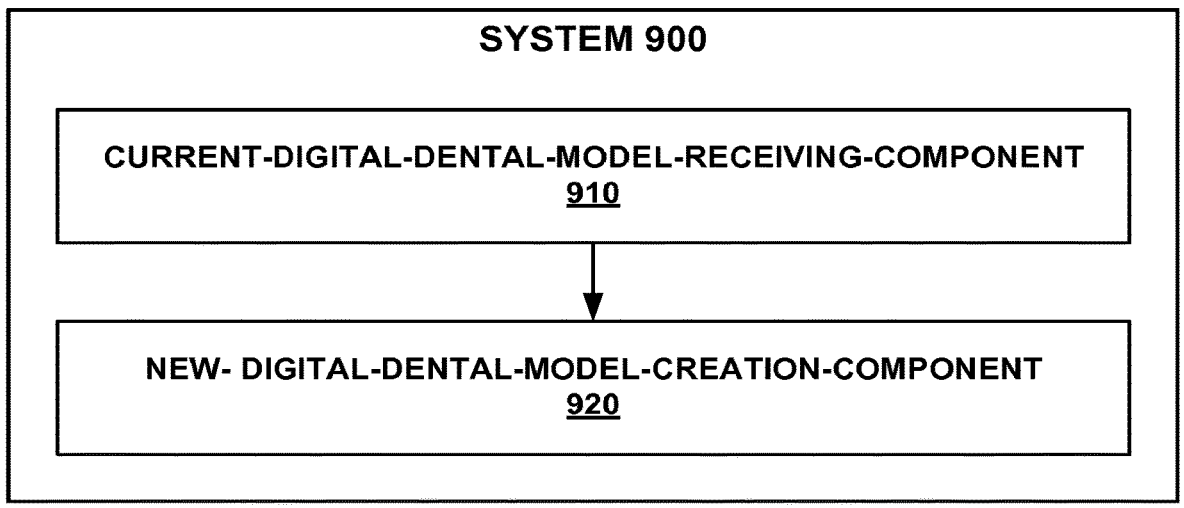
FIG. 9 is a block diagram of a system for creating a subsequent dental appliance prior to removal of a current dental appliance from a set of physical teeth for a patient, according to one embodiment.

FIG. 9 is a block diagram of a system for creating a subsequent dental appliance prior to removal of a current dental appliance from a set of physical teeth for a patient, according to one embodiment. The blocks that represent features in FIG. 9 can be arranged differently than as illustrated, and can implement additional or fewer features than what are described herein. Further, the features represented by the blocks in FIG. 9 can be combined in various ways. The system 900 can be implemented using hardware, hardware and software, hardware and firmware, or a combination thereof.

The system 900 includes a current-digital-dental-model-receiving-component 910 and a new-digital-dental-model-creation-component 920. The new-digital-dental-model can either be segmented, partially segmented or unsegmented. The current-digital-dental-model-receiving-component 910 is suitable for receiving a current digital dental model 210 (FIGS. 2b-6b) that includes a representation of the set of physical teeth 100 (FIG. 1a) for the patient with the current dental appliance 112, 122, 132, 152, 162, 800, 820 (FIGS. 1b, 1c, 1d, 1f, 1g, 8a, 8b) attached to the physical teeth 100 or oral cavity 810a, 810b (FIGS. 8a, 8b) where the physical teeth 100 (FIG. 1a) are at a position in treatment when all or a part of the current dental appliance 112, 122, 132, 152, 162, 800, 820 is desired to be removed from one or more of the set of physical teeth 100 and it is desired to use a subsequent appliance. Alternatively, the received current digital dental model 210 includes the representation of the set of physical teeth 100 for the patient with the current dental appliance 112, 122, 132, 152, 162, 800, 820 attached to the physical teeth 100 that are at or close to a desired teeth arrangement. According to one embodiment, the received current digital dental model 210 (FIG. 2b-6b) is a direct digital scan of the set of physical teeth 100 and the current dental appliance 112, 122, 132, 152, 162, 800, 820.

The new-digital-dental-model-creation-component 920 is suitable for computer automated creation of a new digital dental model 220-620 (FIGS. 2c-6c) that includes the representation of the set of physical teeth 100 without including the current dental appliance 112, 122, 132, 152, 162, 800, 820 (FIGS. 1b, 1c, 1d, 1f, 1g, 8a, 8b) where the new digital dental model 220-620 (FIGS. 2c-6c) includes electronic data suitable for manufacturing of the subsequent dental appliance prior to removal of the current dental appliance 112, 122, 132, 152, 162, 800 from the set of physical teeth 100 (FIG. 1a) or the oral cavity 810a, 810b (FIGS. 8a, 8b).

The new-digital-dental-model-creation-component 920 may be further suitable for superimposing a segmented digital tooth 200a-200d (FIG. 2a) of the patient on corresponding individual digital tooth 210a-210d (FIG. 2b) associated with the current digital dental model 210 (FIG. 2b) where the segmented digital tooth 200a-200d was obtained from a digital dental model taken of the set of physical teeth 100 of the patient without the current dental appliance 112, 122, 132, 152, 162, 800, 820 (FIGS. 1b, 1c, 1d, 1f, 1g, 8a, 8b) attached. The new-digital-dental-model-creation-component 920 may be further suitable for superimposing a second representation of all 300 (FIG. 3a) or a portion 300a, 300b (FIG. 3a) of the current dental appliance 112, 122, 132, 152, 162, 800, 820 (FIGS. 1b, 1c, 1d, 1f, 1g, 8a, 8b) on the current dental appliance 122 (FIG. 1b) associated with the first representation 210, wherein the second representation 300, 300a, 300b (FIG. 3a) of the current dental appliance is obtained from a source selected from a group consisting of a library of dental appliances and an image of the current dental appliance when not applied to the set of physical teeth. The new-digital-dental-model-creation-component 920 may be further suitable for estimating a contour 450 of a subset 440 of a digital tooth 210b included in the current digital dental model 210 (FIGS. 2b-6b) where the estimating is based on a contour 404 of the underneath surface 402 of a bracket base 400. The new-digital-dental-model-creation-component 920 may be further suitable for creating a similar digital tooth 600 based on an average of a plurality of physical teeth and determining a contour of a portion 630 of the digital tooth 210b of the current digital dental model 210 (FIGS. 2b-6b) based on a corresponding portion 610 the similar digital tooth 600.

According to one embodiment, the new digital dental model 220-620 (FIGS. 2c-6c) is an intermediate digital dental model and the new-digital-dental-model-creation-component 920 is further suitable for creating one of a series of intermediate digital dental models (also referred to herein as "a series of new digital dental models"). The series of intermediate digital dental models may approximate a series of changes in gingival contour 730 (FIG. 7) of the patient, as discussed herein. The changes in the gingival contour 730 of the patient can be determined or estimated based on a simulation, as discussed herein. The changes in the gingival contour 730 of the patient can be determined or estimated based on an original gingival contour of the patient without requiring simulation, as discussed herein. The changes in the gingival contour 730 of the patient may be due to the gingival contour changing at various points in time t0 to t3 (FIG. 7).

According to one embodiment, the new digital dental model 220-620 (FIGS. 2c-6c) is an intermediate digital dental model and the new-digital-dental-model-creation-component 920 is further suitable for creating one of a series of intermediate digital dental models (also referred to herein as "a series of new digital dental models"), as discussed herein.

Figure 10:
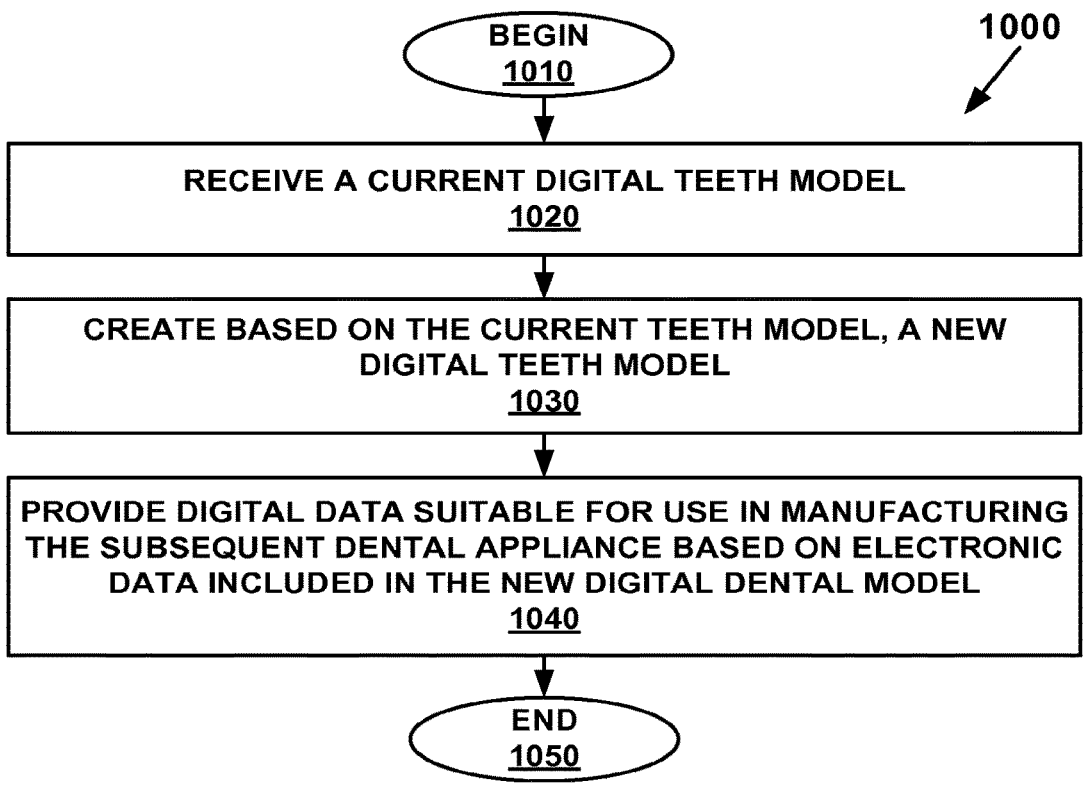
FIG. 10 depicts a flow chart of a method of creating a subsequent dental appliance prior to removal of a current dental appliance from a set of physical teeth for a patient, according to one embodiment.
Figure 11:
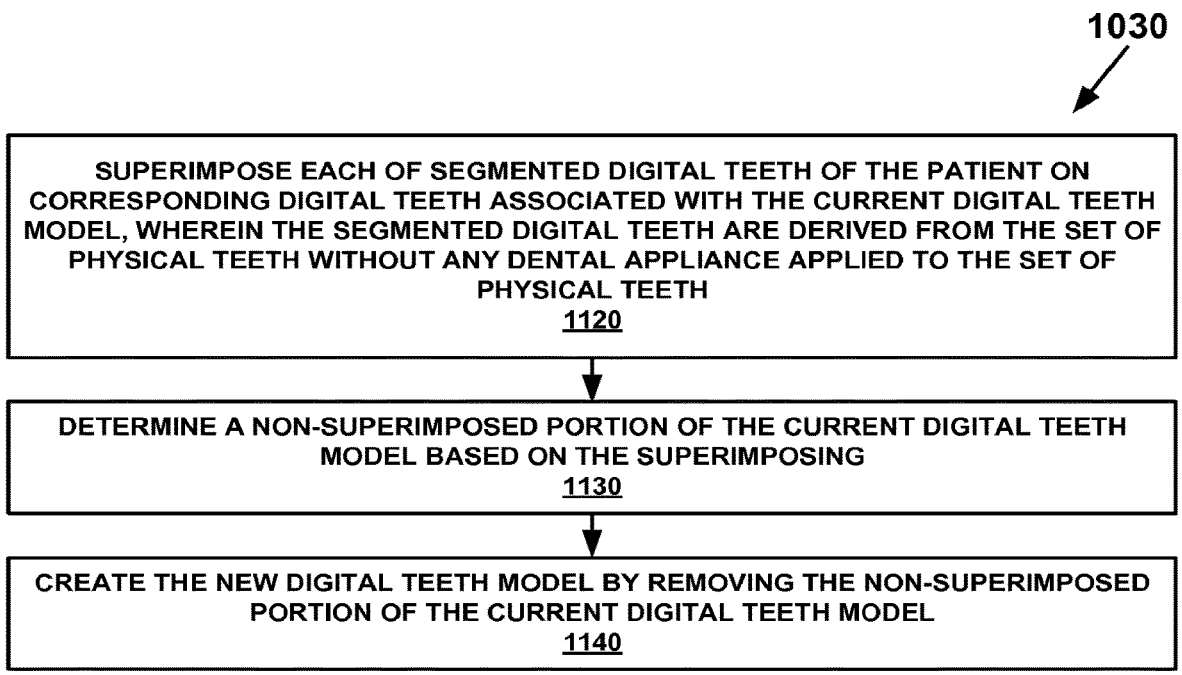
FIGS. 11-15 depict flowcharts of methods for creating a new digital dental model, according to various embodiments.
Figure 12:
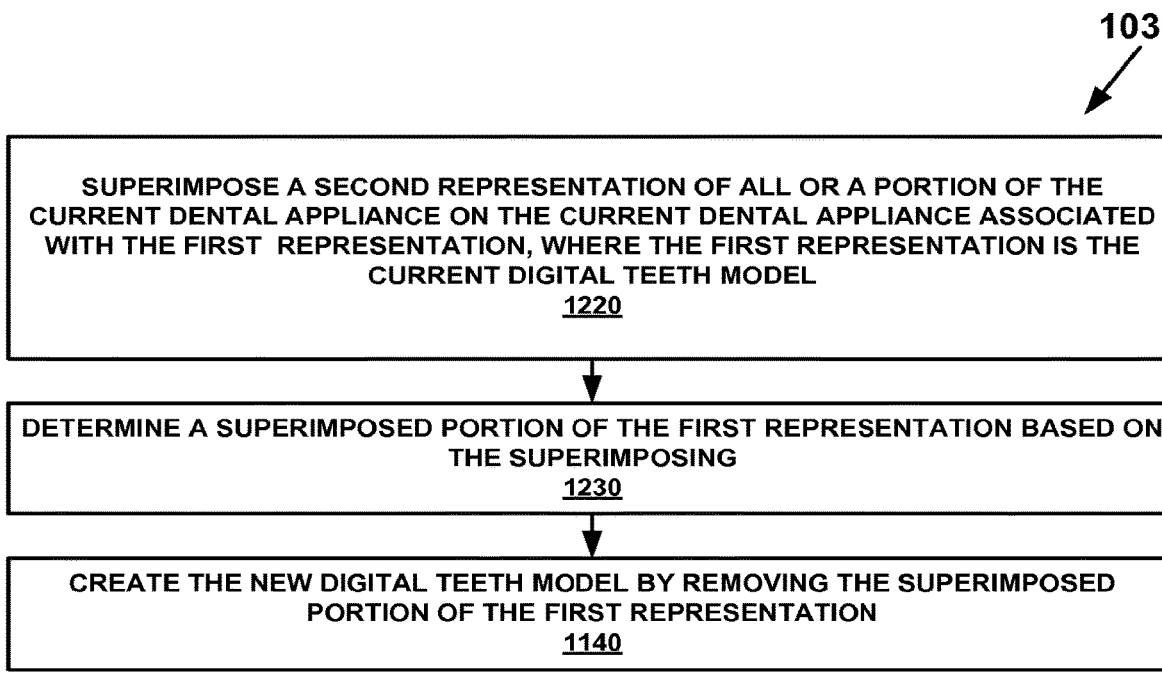
Figure 13:
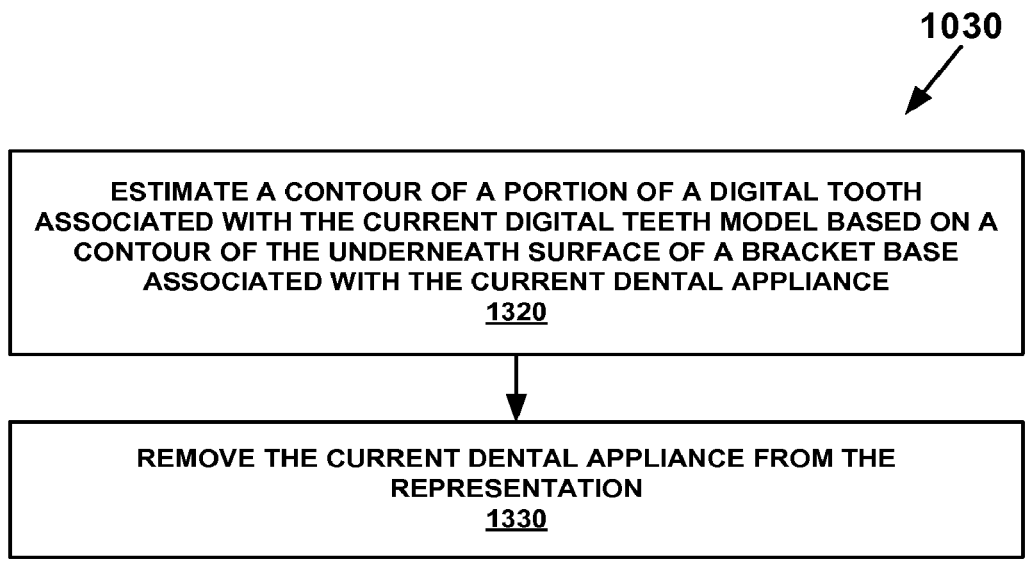
Figure 14:
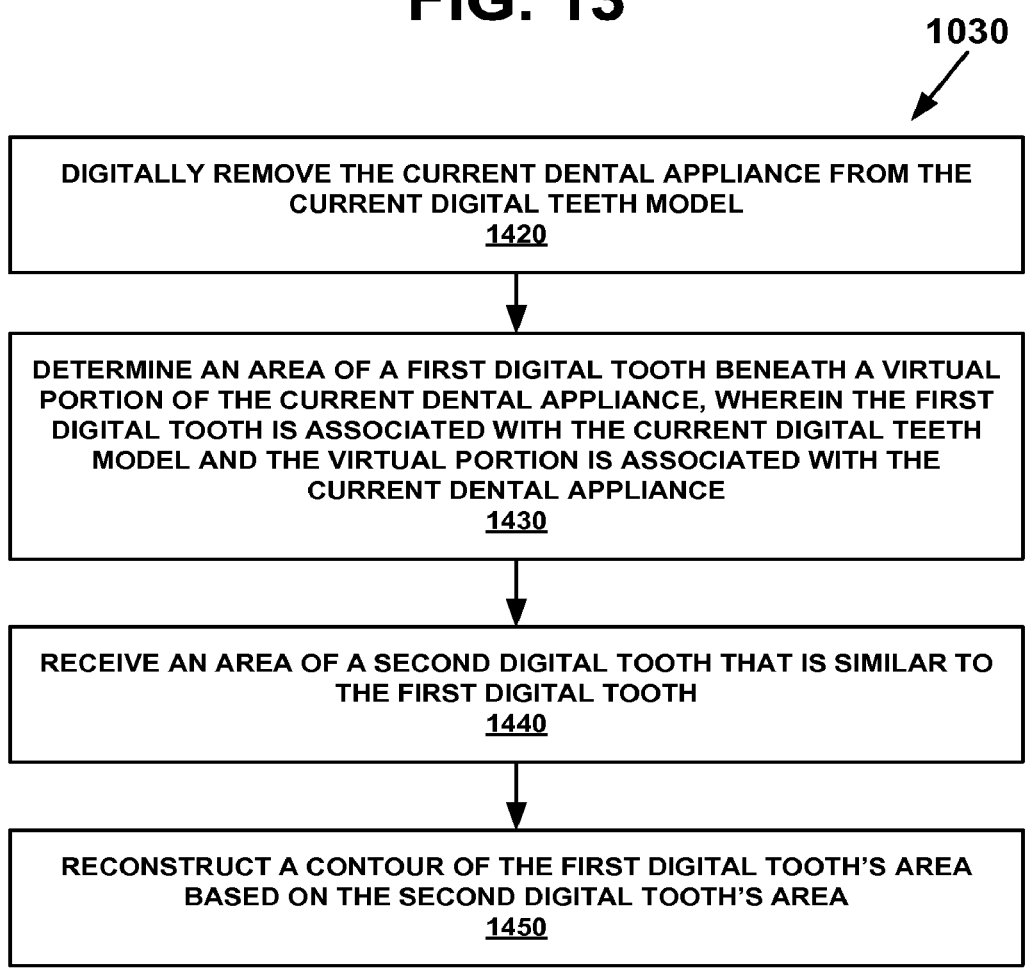
Figure 15:
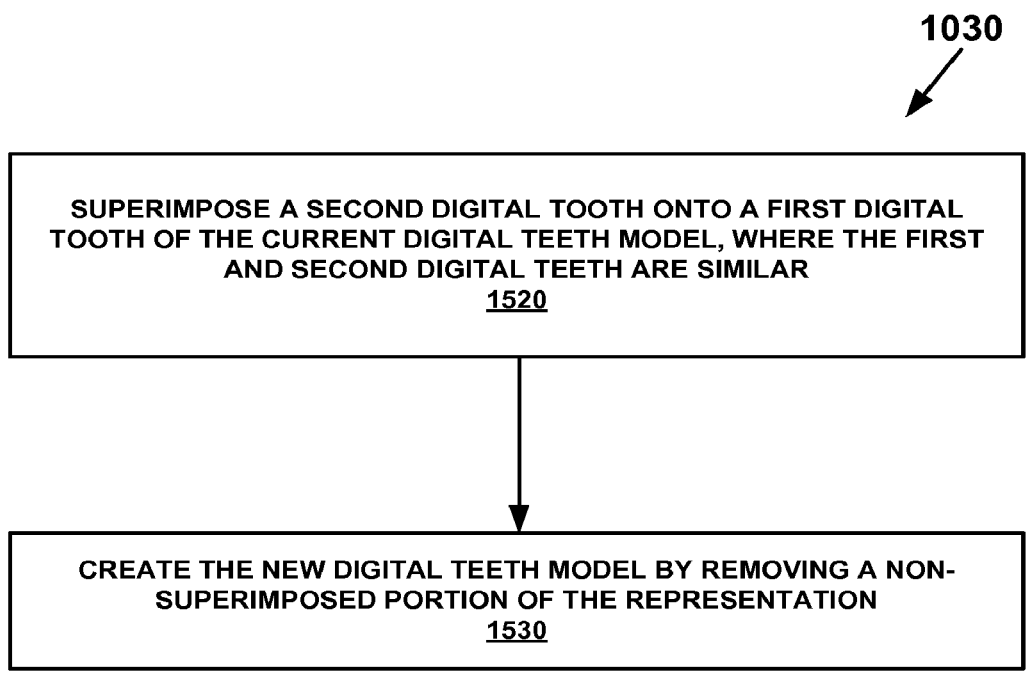

FIG. 10 depicts a flow chart 1000 of a method of creating a subsequent dental appliance prior to removal of a current dental appliance from a set of physical teeth for a patient, according to one embodiment. A current dental appliance 112, 122, 132, 152, 162, 800, 820 (FIGS. 1b, 1c, 1d, 1f, 1g, 8a, 8b) is attached to a patient's set of physical teeth 100 (FIG. 1a) or oral cavity 810a, 810b (FIGS. 8a, 8b). A current digital dental model 210 (FIG. 2b) can be created using various types of scanning or imaging. For example, an intraoral scan of the patient's physical teeth 100 (FIG. 1a) or of the patient's physical teeth 100 and oral cavity 810a, 810b (FIGS. 8a, 8b) with the current dental appliance 112, 122, 132, 152, 162 (FIG. 1b, 1c, 1d, 1f, 1g) attached can be used to create a current digital dental model 210 (FIGS. 2b-6b). According to one embodiment, the current digital dental model is a direct digital scan of the set of physical teeth and the current dental appliance At 1010, the method begins. At 1020, a current digital dental model 210 (FIGS. 1b-6b) is received that includes a representation of the set of physical teeth 100 (FIG. 1a) for the patient with the current dental appliance 112, 122, 132, 152, 162, 800, 820 (FIGS. 1b, 1c, 1d, 1f, 1g, 8a, 8b) attached to the physical teeth 100 (FIG. 1a) or oral cavity 810a, 810b (FIGS. 8a, 8b), where the physical teeth 100 are at a position in treatment when all or a part of the current dental appliance 112, 122, 132, 152, 162, 800, 820 is desired to be removed from one or more of the set of physical teeth 100 and it is desired to use a subsequent appliance. According to another embodiment, the received current digital dental model 210 includes the representation of the set of physical teeth 100 for the patient with the current dental appliance 112, 122, 132, 152, 162, 800, 820 attached to the physical teeth 100 that are at or close to a desired teeth arrangement.

The current dental appliance may be any dental appliance that can be attached to one or more of the patient's physical teeth 100 (FIG. 1a) or to the patient's oral cavity 810, 810b (FIGS. 8a, 8b).

At 1030, a new digital dental model 220-620 (FIGS. 2c-6c) that includes the representation of the set of physical teeth 100 (FIG. 1a) without including the current dental appliance 112, 122, 132, 152, 162, 800, 820 (FIGS. 1b, 1c, 1d, 1f, 1g, 8a, 8b) is created based on the current digital dental model 210 (FIG. 2b). Various embodiments can be used for creating a new digital dental model 220-620 (FIGS. 2c-6c), which shall be described in the context of FIGS. 11-15, among others.

Referring to FIGS. 2a-2c and 11, at 1120 each 200a-200d of segmented digital teeth 200 of the patient is superimposed on corresponding digital teeth 210a-210d associated with the current digital dental model 210. The segmented digital teeth 200a-200d are derived from the set of physical teeth 100 without any dental appliance 112, 122, 132, 152, 162, 800, 820 (FIGS. 1b, 1c, 1d, 1f, 1g, 8a, 8b) applied to the set of physical teeth 100. At 1130, a non-superimposed portion of the current digital dental model 210 is determined based on the superimposing 1120. At 1140, the new digital dental model 220 is created by removing the non-superimposed portion of the current digital dental model 210 that was determined at 1130.

Referring to FIGS. 3a-3c and 12, at 1220 a second representation 300, 300a, 300b of all or a portion of the current dental appliance is superimposed on the current dental appliance 112, 122, 132, 152, 162, 800, 820 (FIGS. 1b, 1c, 1d, 1f, 1g, 8a, 8b) associated with the first representation 210, where the first representation 210 is the current digital dental model 210. At 1230, a superimposed portion of the first representation 210 (FIG. 3b) is determined based on the superimposing at 1220. The new digital dental model 320 (FIG. 3c) is created at 1240 by removing the superimposed portion, associated with 300, 300a, 300b (FIG. 3a), of the first representation 210 that was determined at 1230.

Referring to FIGS. 4a-4c and 13, at 1320, a contour 450 of a portion 440 of a digital tooth 210b associated with the current digital dental model 210 is estimated based on a contour 404 of the underneath surface 402 of a bracket base 400 associated with the current dental appliance 112. At 1330, the current dental appliance 112 is removed from the representation 210, for example, as described in the context of FIGS. 3a-c and 12.

Referring to FIGS. 5a-5c and 14, at 1420 a second digital tooth 500b is superimposed onto a first digital tooth 210b of the current digital dental model 210, wherein the first digital tooth 210b and the second digital tooth 500b are similar. In a first example, the second digital tooth 500b that is superimposed on the first digital tooth 210b can be an average of a plurality of digital teeth that are not derived from the physical teeth 100 of the patient. In a second example, the first and second digital teeth 210b, 500b may represent different physical teeth of the patient. In a third example, the second digital tooth 500b may represent a physical tooth of a person that is not the patient. The size of the second digital tooth 500b may be scaled based on the size of the first digital tooth 210b that it is suited to superimpose. For example, the second digital tooth 500b may be sized to match or slightly exceed the first digital tooth 210b's size. At 1430, the new digital dental model 520 is created by removing a non superimposed portion of the representation.

Referring to FIGS. 6a-6c and 15, at 1520, the current dental appliance 112, 122, 132, 152, 162, 800, 820 (FIGS. 1b, 1c, 1d, 1f, 1g, 8a, 8b) is digitally removed from the representation 210. At 1530, an area 630 of a first digital tooth 210b beneath a virtual portion of the current dental appliance 112, 122, 132, 152, 162, 800, 820 (FIGS. 1b, 1c, 1d, 1f, 1g, 8a, 8b) is determined, where the first digital tooth 210b is associated with the current digital dental model 210 and the virtual portion is associated with the current dental appliance 1112, 122, 132, 152, 162, 800, 820 (FIGS. 1b, 1c, 1d, 1f, 1g, 8a, 8b). Examples of the virtual portion are a bracket, a wire, button, a cleat, a tube, a hook, a band, a ligature wire, an aligner attachment and an O-ring.

The following is an example of combining various embodiments to create a new digital dental model. The current dental appliance 300 can be removed from the representation 210, as illustrated FIGS. 3a-3c, for example. An area 440 of a first digital tooth 210b beneath a virtual portion 400 of the current dental appliance 112, 122, 132, 152, 162, 800, 820 (FIGS. 1b, 1c, 1d, 1f, 1g, 8a, 8b) can be determined, where the first digital tooth 210b is associated with the current digital dental model 210 and the virtual portion 400 is associated with the current dental appliance 112, 122, 132, 152, 162, 800, 820 (FIGS. 1b, 1c, 1d, 1f, 1g, 8a, 8b), as described illustrated in FIGS. 4a-4c, for example. An area 610 of a second digital tooth 600 that is similar to the first digital tooth 210b is received and a contour of the first digital tooth's area 630 is reconstructed based on the second digital tooth 600's area 610, as illustrated in FIGS. 6a-6c, for example.

The following is another example of combining various embodiments to create a new digital dental model. A segmented digital tooth 200a-200d of the patient can be superimposed on a first digital tooth 210a associated with the current digital dental model 210 as illustrated in FIGS. 2a-2c. A second representation 300, 300a, 300b of all or a portion of the current dental appliance can be superimposed on the current dental appliance associated with the current digital dental model 210 as discussed in the context of FIGS. 3a-3c. A contour of a portion of a second digital tooth 210b of the current digital dental model 210 can be estimated based on a contour 404 of the underneath surface 402 of a portion 400 of the current dental appliance 112, 122, 132, 152, 162, 800, 820 (FIGS. 1b, 1c, 1d, 1f, 1g, 8a, 8b) as illustrated in FIG. 4b. All or a portion 610 of a similar digital tooth 500c, 600 can be superimposed on a third digital tooth 210c of the current digital dental model 210 as discussed in the context of FIGS. 5a, 5b and 6a. According to one embodiment, the first digital tooth 210a, the second digital tooth 210b and the third digital tooth 210c correspond to different ones of the patient's physical teeth 100a-100c.

Various embodiments for creating a new digital dental model 220-620 (FIGS. 2c-6c) are also well-suited for including the gingiva 710 (FIG. 7) in a new digital dental model 220-620 (FIGS. 2c-6c) or changes to the gingiva 710, as indicated by 720 (FIG. 7), in a series of new digital dental models 220-620 (FIGS. 2c-6c) as discussed herein. Various embodiments are well-suited for changes in the gingiva due to a TAD 800 (FIGS. 8a, 8b), or any other type of dental appliance that may cause the gingival to change, as discussed herein.

Figure 1D:
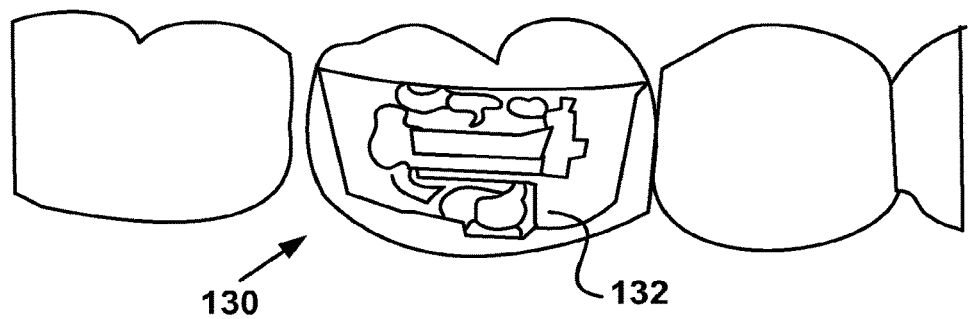
Figure 1E:
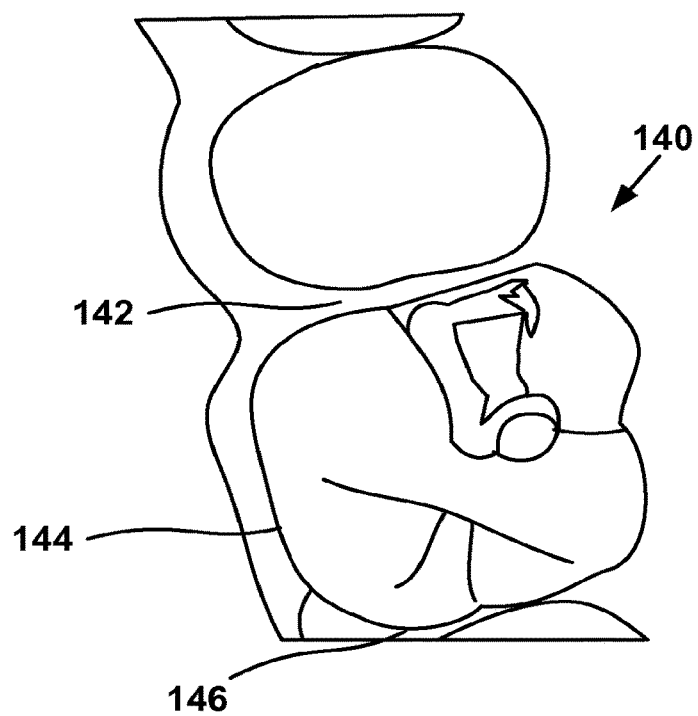
FIG. 1e illustrates a patient's physical teeth after the removal of an orthodontic band, according to one embodiment.
Figure 1F:
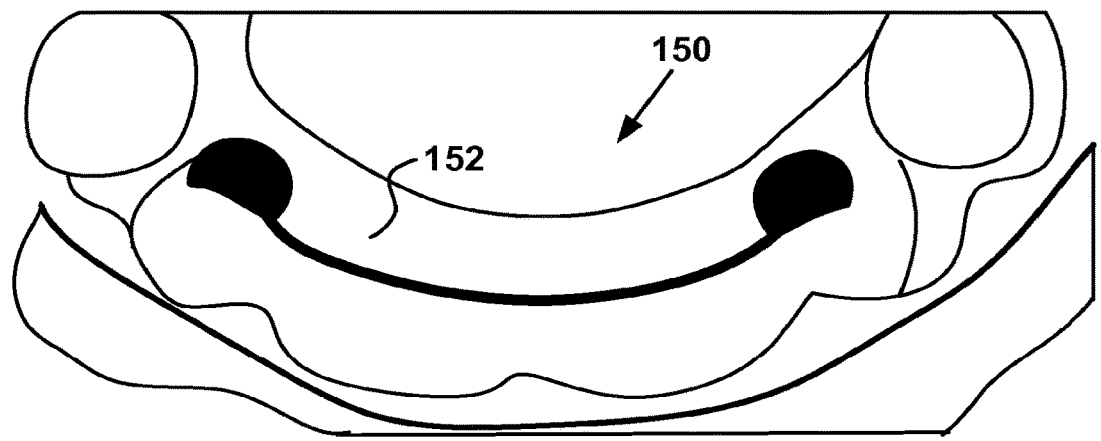
Figure 1G:
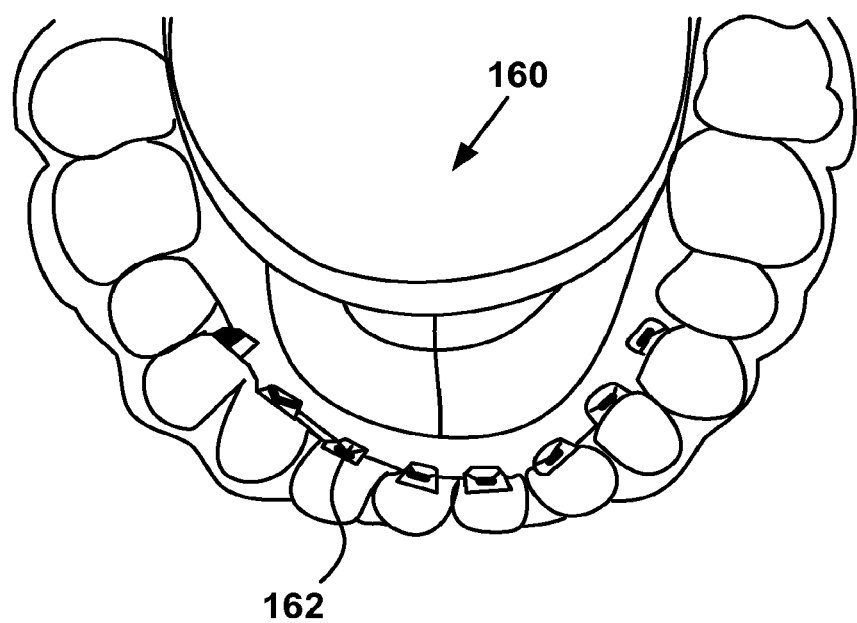

According to one embodiment, the physical teeth 100 (FIG. 1a) are close but not at the desired teeth arrangement when the current digital dental model 210 (FIGS. 2b-6b) is created. Therefore, according to one embodiment, when the current digital dental model 210 (FIGS. 2b-6b) is created when the patient's physical teeth 100 are close but not at the desired teeth arrangement, positions of one or more digital teeth in the new digital dental model 220-620 (FIGS. 2c-6c) are adjusted to the desired teeth arrangement. According to one embodiment, there may be an interproximal space between two physical teeth 100 due to a feature of the current dental appliance 112, 122, 132, 152, 162, 800 (FIGS. 1b, 1c, 1d, 1f, 1g, 8a, 8b), such as an orthodontic band 132 (FIG. 1d). Information pertaining to one or more dimensions of the feature or descriptions of the feature can be used to determine how to adjust the positions of the one or more digital teeth in the new digital dental model 220-620 (FIGS. 2c-6c). A subsequent dental appliance that is manufactured based on a new digital dental model 220-620 (FIGS. 2c-6c) adjusted to the desired teeth arrangement can be used to move the physical teeth 100 (FIG. 1a) to the desired teeth arrangement. A digital tooth's 3D coordinates can be used as a part of adjusting positions, as discussed herein. According to one embodiment, the current digital dental model 210 (FIGS. 2b-6b) and the new digital dental model 220-620 (FIGS. 2c-6c) include digital teeth that each correspond to one of the patient's physical teeth 100a-100b (FIG. 1a).

At 1040, digital data suitable for use in manufacturing the subsequent dental appliance is provided based on electronic data included in the new digital dental model 220-620 (FIGS. 2c-6c) prior to removal of the current dental appliance 112, 122, 132, 152, 162, 800, 820 (FIGS. 1b, 1c, 1d, 1f, 1g, 8a, 8b) from the set of physical teeth 100 or the oral cavity 810a, 810b (FIGS. 1a, 8a, 8b). Examples of a subsequent dental appliance are a retainer, an (active) aligner, a splint, an expander, or a positioner. The retainer may be a Hawley, an Essix-type retainer, a bonded wire, a vacuum-formed stent, spring-retainer type, a clear splint type, or a combination thereof. In the event that treatment is a combination between braces and removable aligners, the subsequent device may be a clear removable aligner or series of aligners similar to a retainer, but designed to continue with orthodontic movement of the teeth. At least one example of a splint is an orthognathic surgery splint, among others. According to one embodiment, 1040 is optional.

At 1050, the method ends. The receiving at 1020 and the creating at 1030 are performed by one or more computer processors, according to one embodiment. Although specific operations are disclosed in flowchart 1000, such operations are exemplary. That is, embodiments of the present invention are well-suited to performing various other operations or variations of the operations recited in flowchart 1000. It is appreciated that the operations in flowchart 1000 may be performed in an order different than presented, and that not all of the operations in flowchart 1000 may be performed.

According to one embodiment, a subsequent dental appliance can be manufactured based on the provided digital data, such as electronic data included in the new digital dental model, prior to removal of all or part of the current dental appliance from the set of physical teeth. For example, the electronic data included in the new digital dental model can be used to fabricate a mold using a rapid-prototyping machine or milling machine and forming the subsequent dental appliance over the mold.

Figure 16:
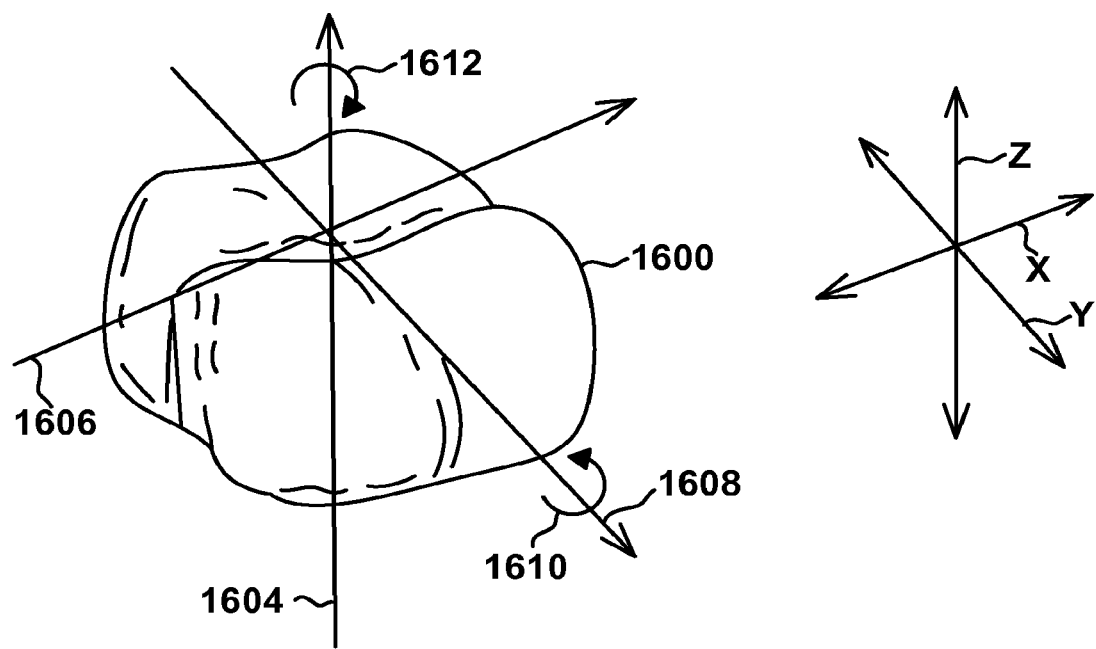
FIG. 16 depicts a digital tooth 1600 that represents one of the patient's set of physical teeth that may be moved from one position of treatment to another position of treatment, according to one embodiment.

FIG. 16 depicts a digital tooth 1600 that represents one of the patient's set of physical teeth that may be moved from one position of treatment to another position of treatment, according to one embodiment. According to one embodiment, the digital tooth 1600 represents a segmented or partially segmented digital tooth, that has one or more axes and three dimensional (3D) coordinates so that the digital tooth 1600 can be freely positioned in 3D space. For example, the 3D coordinates x, y, and z alone or 3D coordinates x, y, and z in combination with one or more axes 1604, 1606, 1608 can be used for positioning the digital tooth 1600.

As a frame of reference describing how a digital tooth 1600 may be moved, an arbitrary centerline (CL) may be drawn through the digital tooth 1600. With reference to this centerline (CL), a tooth 1600 may be moved in orthogonal directions represented by axes 1604, 1606, and 1608 (where 1604 is the centerline). The centerline may be rotated about the axis 1608 (root angulation) and the axis 1604 (torque) as indicated by arrows 1610 and 1612, respectively. Additionally, the tooth 1600 may be rotated about the centerline, as represented by an arrow 1612. Thus, all possible free-form motions of the tooth 1600 can be performed.

Figure 17:
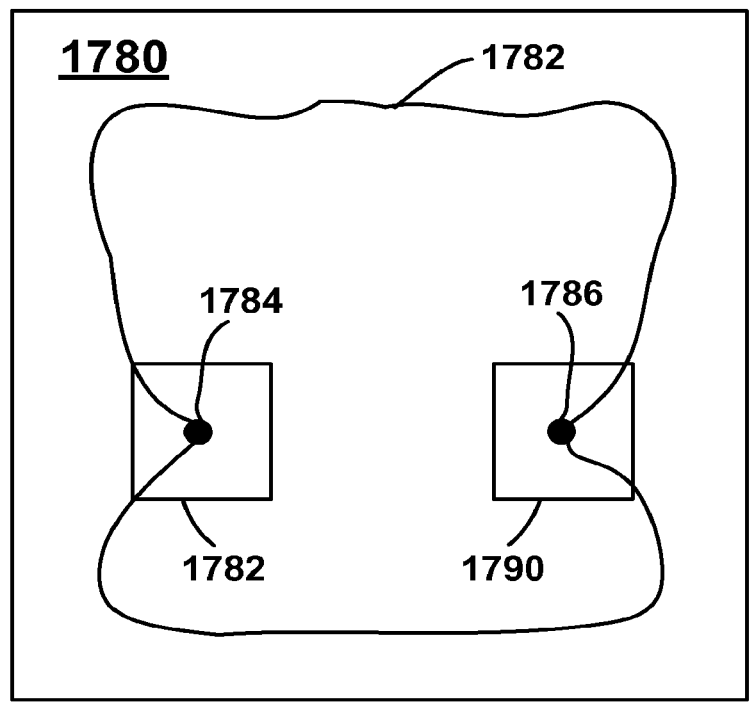
FIGS. 17-19 illustrate a technique for identifying the gingival margin that defines the boundary between tooth and gum in the patient's dentition and simulating changes in the gingiva, according to one embodiment.
Figure 19:
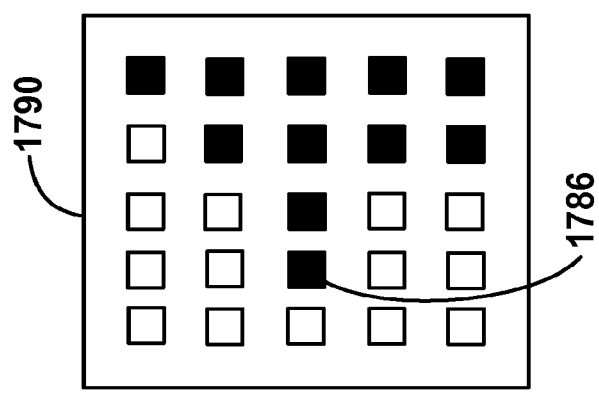
Figure 18:
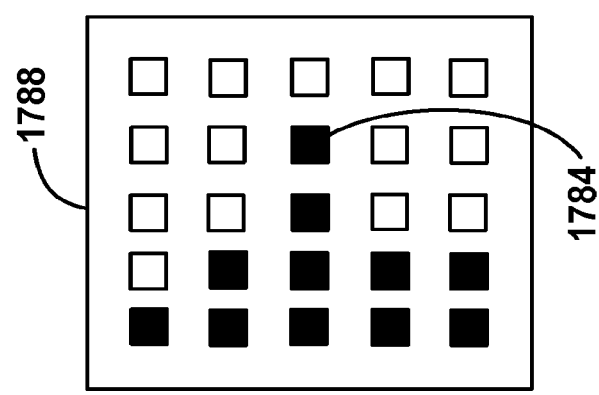

FIGS. 17-19 illustrate a technique for identifying the gingival margin that defines the boundary between tooth and gum in the patient's dentition and simulating changes in the gingiva, according to one embodiment. This technique involves the creation of a series of horizontal 2D-planes 1780, or slices, that intersect the dentition model roughly perpendicular to the occlusal plane. The cross-sectional surface 1782 of the dentition model in each of these planes 1780 includes cusps 1784, 1786 that represent the gingival margin. The computer identifies the gingival margin by applying one or more of the cusp detection techniques described above.

One technique is very similar to the neighborhood filtered cusp detection technique described above, in that voxel neighborhoods 1788, 1790 are defined on one of the 2D-planes to focus the computer's search for cusps on adjacent 2D plane. Upon detecting a pair of cusps 1784, 1786 on one 2D plane, the computer defines one or more neighborhoods 1788, 1790 to include predetermined number of voxels surrounding the pair. The computer projects the neighborhoods onto an adjacent 2D plane by identifying the voxels on the adjacent plane that correspond to the voxel in the neighborhoods 1788, 1790 on the original plane. The computer then identifies the pair of black voxels that lie closest together in the two neighborhoods on the adjacent plane, labeling these voxels as lying in the cusp. The computer repeats this process for all remaining planes.

Many of these automated segmentation techniques are even more useful and efficient when used in conjunction with human-assisted techniques. For example, techniques that rely on the identification of the interproximal or gingival margins function more quickly and effectively when a human user first highlights the interproximal or gingival cusps in a graphical representation of the dentition model. One technique for receiving this type of information from the user is by displaying a 2D or 3D representation and allowing the user to highlight individual voxels in the display. Another technique allows the user to scroll through a series of 2D cross-sectional slices, identifying those voxels that represent key features such as interproximal or gingival cusps. Some of these techniques rely on user interface tools such as cursors and bounding-box markers.

In many instances, the computer creates proposals for segmenting the dentition model and then allows the user to select the best alternative. For example, one version of the arch curve fitting technique requires the computer to create a candidate catenary or spline curve, which the user allowed to modify by manipulating the mathematical control parameters. One technique involves displaying several surfaces that are candidates cutting surfaces and allowing the user to select the appropriate surfaces.

According to one embodiment, a tangible computer readable storage medium having computer-executable instructions stored thereon for causing a computer system to perform a method of creating a subsequent dental appliance prior to removal of a current dental appliance 112, 122, 132, 152, 162, 820 (FIGS. 1b, 1c, 1d, 1f, 1g, 8b) from a set of physical teeth 100 (FIG. 1a) for a patient is provided. According to one embodiment, the tangible computer readable storage medium provides for receiving 1020 a current digital dental model 210 (FIG. 2b-6b) that includes a representation of the set of physical teeth 100 (FIG. 1a) for the patient with the current dental appliance 112, 122, 132, 152, 162, 800, 820 (FIGS. 1b, 1c, 1d, 1f, 1g, 8a, 8b) attached to the physical teeth 100 or oral cavity 810a, 810b (FIGS. 8a, 8b), where the current digital dental model 210 is a direct digital scan of the set of physical teeth 100 and the current dental appliance 112, 122, 132, 152, 162, 800, 820 and wherein the physical teeth 100 are at a position in treatment when all or a part of the current dental appliance 112, 122, 132, 152, 162, 800, 820 is desired to be removed from one or more of the set of physical teeth 100 and it is desired to use a subsequent appliance.

According to one embodiment, the creating 1030 (FIG. 10) is computer automated. According to one embodiment, the new digital dental model 220-620 (FIGS. 2c-6c) includes electronic data suitable for manufacturing of the subsequent dental appliance prior to removal of the current dental appliance 112, 122, 132, 152, 162, 800, 820 (FIGS. 1b, 1c, 1d, 1f, 1g, 8a, 8b) from the set of physical teeth 100 (FIG. 1a) or oral cavity 810a, 810b (FIGS. 8a, 8b).

A new digital dental model 220-620 (FIGS. 2c-6c), according to various embodiments, provides for more quickly, more cheaply making subsequent dental appliances that fit the patient's physical teeth and gingiva better. A new digital dental model 220-620 (FIGS. 2c-6c), according to various embodiments, provides for increased patient compliance (due to improved appliance comfort when worn, for example) and reduced chance of relapse as a result. A new digital dental model 220-620 (FIGS. 2c-6c), according to various embodiments, significantly reduces the chance of relapse because the subsequent digital appliance is made from the new digital dental model 220-620 (FIGS. 2c-6c) while the current dental appliance is still attached to the patient's physical teeth. Further, the subsequent digital appliance can be applied immediately upon removal of the current dental appliance. Further, a new digital dental model 220-620 (FIGS. 2c-6c) can be created without using physical impressions or without requiring the use of physical impressions and associated processes such as blocking out the teeth with wax, for example, prior to taking the impression. A new digital dental model 220-620 (FIGS. 2c-6c), according to various embodiments, reduces the number of patient appointments and/or additional appliances needed, or a combination thereof in comparison to methods involving physical impressions, since the appliance removal and subsequent appliance delivery can be combined into one appointment. Furthermore, a new digital dental model 220-620 (FIGS. 2c-6c) is not subject to the distortions that can occur while making a manual impression, so the risk of remaking the appliance and the additional time and effort associated due to poor subsequent appliance fit is reduced. The teeth are less likely to undergo a period of time without orthodontic restraint, as would be the case if the braces were removed and a period of time allowed to lapse before the retainer is delivered. A transitional dental appliance to prevent movement during this interim period becomes no longer needed, since the doctor can smoothly transition between braces and the subsequent dental appliance.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method usable in creating a subsequent dental appliance comprising:
   receiving a current digital dental model that includes a first representation of the set of physical teeth for the patient with a current dental appliance attached to the physical teeth or oral cavity;
   creating, based on the current digital dental model, a new digital dental model that includes the first representation of the set of physical teeth without the current dental appliance by:
      superimposing a second representation of all or a portion of the current dental appliance on the current dental appliance associated with the first representation;

determining a superimposed portion of the first representation based on the superimposing; and creating the new digital dental model by removing the superimposed portion of the first representation;

adjusting the new digital dental model by moving one or more teeth to a desired teeth arrangement; and providing digital data suitable for use in manufacturing a subsequent dental appliance based on electronic data included in the new digital dental model.

2. The method as recited by claim 1, wherein the superimposing of the second representation of all or the portion of the current dental appliance further comprises:

superimposing the second representation of the portion selected from a group consisting of a bracket, a wire, button, a cleat, a tube, a hook, a band, a ligature, an aligner attachment and an O-ring.

3. The method as recited by claim 1, wherein the method further comprises:

receiving an image of the current dental appliance when not applied to one or more of the physical teeth of the patient; and using the image as the second representation.

4. The method as recited by claim 1, wherein the method further comprises:

receiving an image of a dental appliance that is the same or similar type of dental appliance as the current dental appliance; and using the image as the second representation.

5. The method as recited by claim 4, wherein the method further comprises:

receiving the image from a library of dental appliances.

6. The method of claim 1, wherein the subsequent dental appliance is an end-of-treatment retainer.

7. The method of claim 1, wherein the subsequent dental appliance is a middle-of-treatment appliance.

8. The method of claim 1, wherein the current digital dental model is created using direct or indirect scanning or imaging.

9. The method of claim 1, wherein the new digital dental model includes a portion of the patient's gingiva that is in proximity of the subsequent dental appliance, would be covered by the subsequent dental appliance, or a combination thereof.

10. The method of claim 1, further comprising simulating one or more changes in the patient's gingiva.

11. A method for creating a subsequent dental appliance prior to removal of a current dental appliance from a set of physical teeth for a patient, the method comprising:

receiving a current digital dental model that includes a representation of the set of physical teeth for the patient with the current dental appliance attached to the physical teeth or oral cavity;

creating, based on the current digital dental model, a new digital dental model that includes the representation of the set of physical teeth without including the current dental appliance by:

superimposing, by the computer processors, each of segmented digital teeth on corresponding digital teeth associated with the current digital dental model;

determining, by the computer processors, a non-superimposed portion of the current digital dental model based on the superimposing; and creating, by the computer processors, the new digital dental model by removing the non-superimposed portion of the current digital dental model or based on a superimposed portion without the non-superimposed portion;

adjusting the new digital dental model by moving one or more teeth to a desired teeth arrangement; and providing digital data suitable for use in manufacturing a subsequent dental appliance based on electronic data included in the new digital dental model.

12. The method of claim 11, wherein the current digital dental model comprises a bracket, a wire, a button, a cleat, a tube, a hook, a band, a ligature, an aligner attachment, or an O-ring.

13. The method of claim 11, wherein the method further comprises:

receiving an image of the current dental appliance when not applied to one or more of the physical teeth of the patient; and associating the image with the current digital dental model.

14. The method of claim 11, wherein the method further comprises:

receiving an image of a dental appliance that is the same or similar type of dental appliance as the current dental appliance; and associating the image with the current digital dental model.

15. The method of claim 14, wherein the method further comprises receiving the image from a library of dental appliances.

16. The method of claim 11, wherein the subsequent dental appliance is an end-of-treatment retainer.

17. The method of claim 11, wherein the subsequent dental appliance is a middle-of-treatment appliance.

18. The method of claim 11, wherein the current digital dental model is created using direct or indirect scanning or imaging.

19. The method of claim 11, wherein the new digital dental model includes a portion of the patient's gingiva that is in proximity of the subsequent dental appliance, would be covered by the subsequent dental appliance, or a combination thereof.

20. The method of claim 11, further comprising simulating one or more changes in the patient's gingiva.

* * * * *